(12) United States Patent
Mukae

(10) Patent No.: US 12,407,412 B2
(45) Date of Patent: Sep. 2, 2025

(54) OPTICAL COMMUNICATION SYSTEM AND FLYING OBJECT ADDRESSING SYSTEM

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 196 days.

(21) Appl. No.: 18/027,925

(22) PCT Filed: Sep. 29, 2020

(86) PCT No.: PCT/JP2020/036804
§ 371 (c)(1),
(2) Date: Mar. 23, 2023

(87) PCT Pub. No.: WO2022/070237
PCT Pub. Date: Apr. 7, 2022

(65) Prior Publication Data
US 2023/0379054 A1 Nov. 23, 2023

(51) Int. Cl.
*H04B 10/118* (2013.01)
(52) U.S. Cl.
CPC .................. *H04B 10/118* (2013.01)
(58) Field of Classification Search
CPC .................................... H04B 10/118
See application file for complete search history.

(56) References Cited

U.S. PATENT DOCUMENTS

| | | | |
|---|---|---|---|
| 5,838,278 | A | 11/1998 | Tsujisawa et al. |
| 2012/0127551 | A1 | 5/2012 | Eto et al. |

(Continued)

FOREIGN PATENT DOCUMENTS

| | | |
|---|---|---|
| JP | S64-25218 A | 1/1989 |
| JP | H02-242114 A | 9/1990 |

(Continued)

OTHER PUBLICATIONS

International Search Report and Written Opinion mailed on Jan. 12, 2021, received for PCT Application PCT/JP2020/036804, filed on Sep. 29, 2020, 8 pages including English Translation.

*Primary Examiner* — Nathan M Cors
(74) *Attorney, Agent, or Firm* — XSENSUS LLP

(57) ABSTRACT

An optical communication system (500) is configured of communication satellites (200) each including an optical communication device and an orbital attitude control device, and a ground facility (701). The optical communication device includes a biaxial rough-precision directivity control device and a biaxial high-precision directivity control device. From a state in which a first communication satellite (201) and a second communication satellite (202) are mutually directed to each other with rough precision, each establishes a high-precision directivity state by the biaxial high-precision directivity control device. And, as mutually tracked by the biaxial rough-precision directivity control device in accordance with a relative position change based on planned orbit information, each corrects a residual directivity error by the biaxial high-precision directivity control device. From a state in which the first communication satellite (201) and a third communication satellite are mutually directed to each other with rough precision, each establishes a high-precision directivity state by the biaxial high-precision directivity control device. And, as mutually tracked by the biaxial rough-precision directivity control device in accordance with a relative position change based on planned orbit information, each corrects a residual directivity error by the biaxial high-precision directivity control device.

22 Claims, 30 Drawing Sheets

(56) References Cited

U.S. PATENT DOCUMENTS

| | | | |
|---|---|---|---|
| 2013/0156439 A1 | 6/2013 | Arnold et al. | |
| 2014/0376914 A1* | 12/2014 | Miniscalco | H04B 10/1129 |
| | | | 398/58 |
| 2015/0244458 A1* | 8/2015 | Erkmen | H04B 7/18504 |
| | | | 398/122 |
| 2018/0323863 A1* | 11/2018 | Bournes | H04B 10/118 |
| 2021/0396888 A1* | 12/2021 | McCormick | H04B 10/118 |
| 2022/0052758 A1* | 2/2022 | Faulkner | H04B 10/118 |

FOREIGN PATENT DOCUMENTS

| | | |
|---|---|---|
| JP | H03-46839 A | 2/1991 |
| JP | H03-162145 A | 7/1991 |
| JP | H06-127496 A | 5/1994 |
| JP | H09-90011 A | 4/1997 |
| JP | H09-121112 A | 5/1997 |
| JP | H10-65620 A | 3/1998 |
| JP | H10-336110 A | 12/1998 |
| JP | H11-109012 A | 4/1999 |
| JP | 2982763 B2 | 11/1999 |
| JP | 2000-68934 A | 3/2000 |
| JP | 2000-111631 A | 4/2000 |
| JP | 2000-165327 A | 6/2000 |
| JP | 2001-326671 A | 11/2001 |
| JP | 2009-290448 A | 12/2009 |
| JP | 2013-132044 A | 7/2013 |
| WO | 2011/007628 A1 | 1/2011 |

* cited by examiner

OPTICAL COMMUNICATION SYSTEM AND FLYING OBJECT ADDRESSING SYSTEM

CROSS-REFERENCE TO RELATED APPLICATION

The present application is based on PCT filing PCT/JP2020/036804, filed Sep. 29, 2020, the entire contents of which are incorporated herein by reference.

TECHNICAL FIELD

The present disclosure relates to an optical communication system and flying object addressing system.

BACKGROUND ART

To address an increase in data amount using communication satellites and an increase in needs for long-distance communication with the moon and planets, practical utilization of inter-satellite optical communication technology has been started. In future, achievement of an optical crosslink network between communication satellites and achievement of optical communication from a communication satellite to a movable body such as an aircraft or UAV (unmanned aerial vehicle) have been envisioned.

On the other hand, in optical communication, the communicating optical communication devices are required to have their optical axes aligned with high pointing accuracy and maintain that state. As optical inter-satellite communication, a technique in which one satellite makes optical communication with another one satellite has been established. However, satellite disturbance suppression measures at the time of routine operation, for example, are important so that a breakdown of communication does not occur by vibrations of the satellites.

Patent Literature 1 discloses that collaborative operation between a rough driving mechanism control system and high-precision driving mechanism control system is enabled, capturing and tracking control are handled in a unified manner, and performance distribution to the rough driving mechanism is optimized.

CITATION LIST

Patent Literature

Patent Literature 1: JP H11-109012 A

SUMMARY OF INVENTION

Technical Problem

Patent Literature 1 does not disclose a method for one satellite to continue optical communication simultaneously with a plurality of communication targets.

To continue optical communication of one satellite simultaneously with a plurality of communication targets, it is required to achieve high-precision directivity direction control simultaneously with a plurality of targets and highly stably maintains that state, thereby increasing the degree of technical difficulty.

Moreover, in communication with a plurality of targets including movable bodies, when the relative position of a communication target is changed, it is required to maintain an optical crosslink while optical communication beams are subjected to directivity change control with a large angle. At the same time, it is required to suppress occurrence of disturbance so as to prevent a breakdown of an optical crosslink with another target due to the influence of fluctuations in directivity with a large angle.

In the present disclosure, for communication satellites as a plurality of communication targets, orbit information is acquired with high accuracy on a real-time basis, a change in the relative position is corrected by a biaxial rough-precision directivity direction changing device, and a residual error is corrected by a biaxial high-precision directivity direction changing device. In the present disclosure, an object is to inhibit a breakdown of communication with a change in directivity direction and continue a highly-stable optical crosslink when optical communication with the plurality of communication targets is performed.

Solution to Problem

An optical communication system according to the present disclosure is configured of three communication satellites each including an optical communication device and an orbital attitude control device, and a ground facility, wherein
the optical communication device includes a biaxial rough-precision directivity control device and a biaxial high-precision directivity control device,
the orbital attitude control device includes a memory to record planned orbit information of the three communication satellites, and exchanges a control signal with the biaxial rough-precision directivity control device,
a first communication satellite flies as performing optical communication simultaneously with a second communication satellite and a third communication satellite,
the ground facility transmits, to the first communication satellite and the second communication satellite, a command of a time when optical communication starts,
the orbital attitude control device of the first communication satellite reads, from the memory, an orbit position of the second communication satellite at the communication start time, and transmits the control signal to the biaxial rough-precision directivity control device to cause the optical communication device to be directed to the second communication satellite,
the orbital attitude control device of the second communication satellite reads, from the memory, an orbit position of the first communication satellite at the communication start time, and transmits the control signal to the biaxial rough-precision directivity control device to cause the optical communication device to be directed to the first communication satellite,
from a state in which the first communication satellite and the second communication satellite are mutually directed to each other with rough precision, each establishes a high-precision directivity state by the biaxial high-precision directivity control device and, as mutually tracked by the biaxial rough-precision directivity control device in accordance with a relative position change based on the planned orbit information, each corrects a residual directivity error by the biaxial high-precision directivity control device,
furthermore, the ground facility transmits, to the first communication satellite and the third communication satellite, a command of a time when optical communication starts,
the orbital attitude control device of the first communication satellite reads, from the memory, an orbit position of the third communication satellite at the communication start time, and transmits the control signal to the biaxial rough-precision directivity control device to cause the optical communication device to be directed to the third communication satellite, the orbital attitude control device of the third communication satellite reads, from the memory, an orbit position of the first communication satellite at the communication start time, and transmits the control signal to the biaxial rough-precision directivity control device to cause the optical communication device to be directed to the first communication satellite, and from a state in which the first communication satellite and the third communication satellite are mutually directed to each other with rough precision, each establishes a high-precision directivity state by the biaxial high-precision directivity control device and, as mutually tracked by the biaxial rough-precision directivity control device in accordance with a relative position change based on the planned orbit information, each corrects a residual directivity error by the biaxial high-precision directivity control device.

Advantageous Effects of Invention

In the optical communication system according to the present disclosure, for communication satellites as a plurality of communication targets, orbit information is acquired with high accuracy on a real-time basis, a change in the relative position is corrected by the biaxial rough-precision directivity direction changing device, and a residual error is corrected by the biaxial high-precision directivity direction changing device. Thus, according to the optical communication system of the present disclosure, when optical communication with the plurality of communication targets is performed, a breakdown of communication with a change in directivity direction is inhibited, and a highly-stable optical crosslink can be continued.

DESCRIPTION OF EMBODIMENTS

Figure 1:
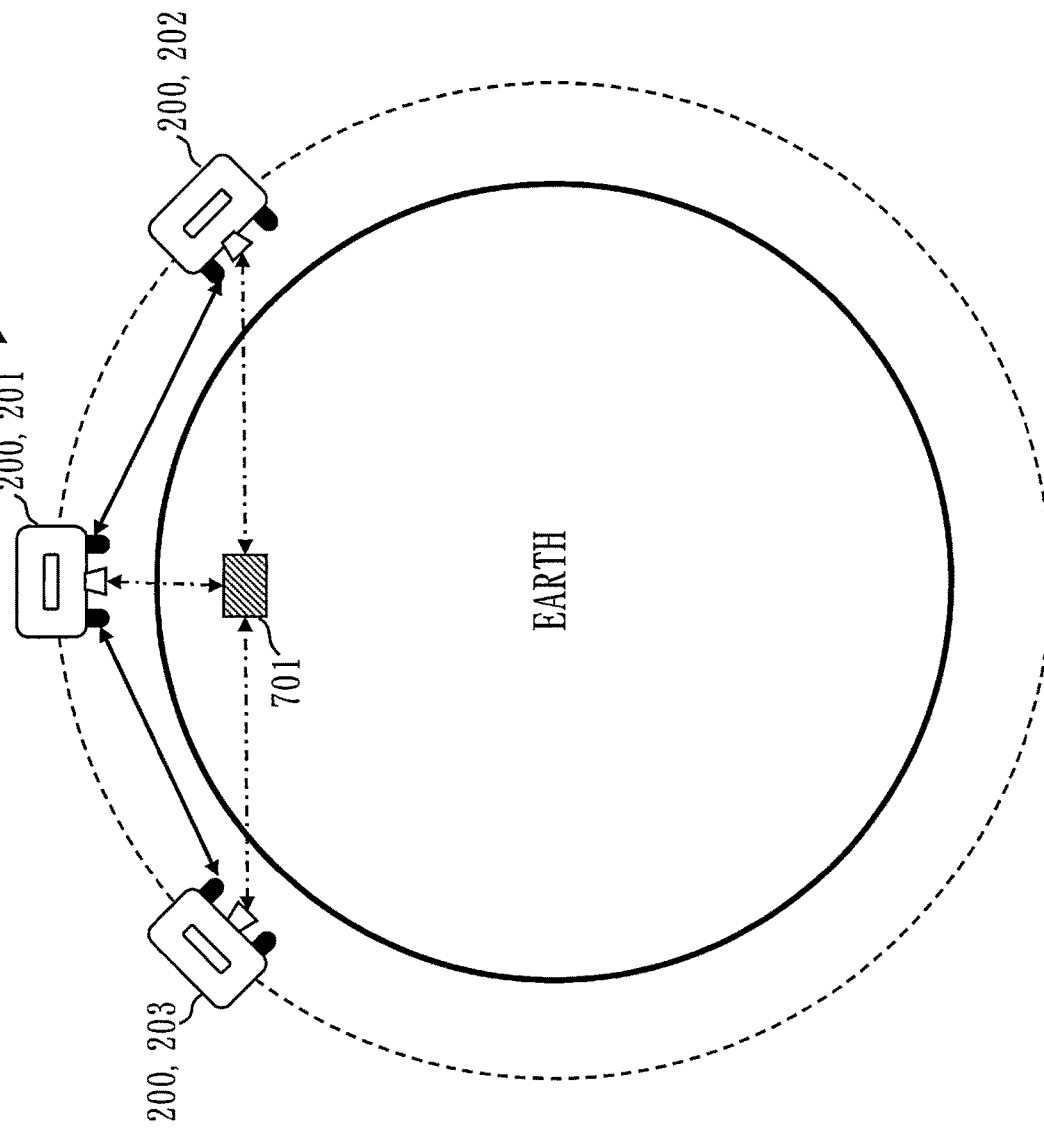
FIG. 1 illustrates an example of structure of an optical communication system adopting Optical Communication Scheme Example 1 according to Embodiment 1.

In the following, embodiments of the present disclosure are described by using the drawings. Note that identical or corresponding portions in each drawing are provided with the same reference characters. In the description of the embodiments, description of identical or corresponding portions is omitted or simplified as appropriate. Also, in the drawings below, the relation in size among the respective structures may be different from the actual one. Furthermore, in the description of the embodiments, directions or positions may be described as "above", "below", "left", "right", "forward", "rear", "front", and "back". These representations are merely for convenience of description and are not meant to limit the arrangement and orientation of structures such as devices, tools, or components.

Embodiment 1

\*\*\*Description of Structure\*\*\*

FIG. 1 illustrates an example of structure of an optical communication system 500 adopting Optical Communication Scheme Example 1 according to the present embodiment.

The optical communication system 500 includes a plurality of communication satellites 200 and at least one ground facility 701. In FIG. 1, the optical communication system 500 includes three communication satellites 200 and one ground facility 701.

The three communication satellites 200 are a first communication satellite 201, a second communication satellite 202, and a third communication satellite 203. In the communication satellites 200, all or part of the first communication satellite 201, the second communication satellite 202, and the third communication satellite 203 are included. Also, an n-th communication satellite 20n described below (n is, for example, a natural number equal to or more than 2 and equal to or less than N, and N is, for example, a natural number equal to or more than 3) is included in the communication satellites 200.

Optical Communication Scheme Example 1 will be described later.

Figure 2:
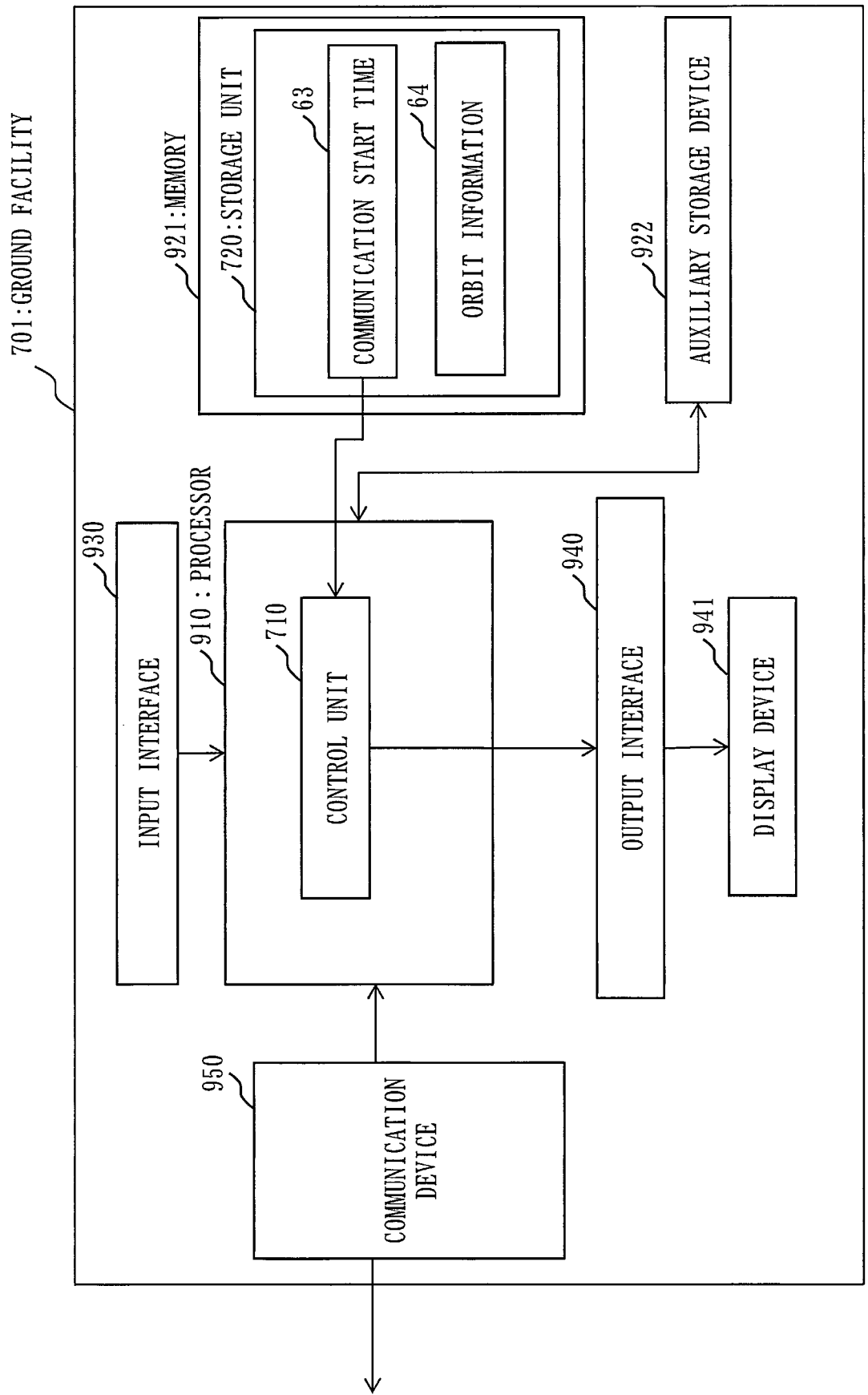
FIG. 2 illustrates an example of structure of a ground facility according to Embodiment 1.

FIG. 2 illustrates an example of structure of the ground facility 701 according to the present embodiment.

The ground facility 701 includes a computer.

The ground facility 701 includes a processor 910 and also includes other pieces of hardware such as a memory 921, an auxiliary storage device 922, an input interface 930, an output interface 940, and a communication device 950. The processor 910 is connected via signal lines to the other pieces of hardware to control these other pieces of hardware.

The ground facility 701 includes a control unit 710 and a storage unit 720 as one example of functional elements. In the storage unit 720, a communication start time 63 and information such as orbit information 64 are stored.

The functions of the control unit 710 are implemented by software. The storage unit 720 is included in the memory 921. Alternatively, the storage unit 720 may be included in the auxiliary storage device 922. Also, the storage unit 720 may be included in the memory 921 and the auxiliary storage device 922 in a divided manner.

The processor 910 is a device which executes a control program. The control program is a program for achieving the functions of each component of the ground facility 701.

The processor 910 is an IC (Integrated Circuit) which performs arithmetic process. Specific examples of the processor 910 are a CPU, DSP (Digital Signal Processor), and GPU (Graphics Processing Unit).

The memory 921 is a storage device which temporarily stores data. A specific example of the memory 921 is SRAM (Static Random Access Memory) or DRAM (Dynamic Random Access Memory).

The auxiliary storage device 922 is a storage device which retains data. A specific example of the auxiliary storage device 922 is an HDD. Also, the auxiliary storage device 922 may be a portable storage medium such as an SD (registered trademark) memory card, CF, NAND flash, flexible disc, optical disc, compact disc, Blu-ray (registered trademark) disc, or DVD. Note that HDD is an abbreviation for Hard Disk Drive. SD (registered trademark) is an abbreviation for Secure Digital. CF is an abbreviation for Compact Flash (registered trademark). DVD is an abbreviation for Digital Versatile Disk.

The input interface 930 is a port connected to an input device such as a mouse, keyboard, or touch panel. The input interface 930 is, specifically, a USB (Universal Serial Bus) terminal. Note that the input interface 930 may be a port connected to a LAN (Local Area Network).

The output interface 940 is a port to which a cable of a display device 941 such as a display is connected. The output interface 940 is, specifically, a USB terminal or HDMI (registered trademark) (High Definition Multimedia Interface) terminal. The display is, specifically, an LCD (Liquid Crystal Display).

The communication device 950 has a receiver and a transmitter. The communication device 950 is, specifically, a communication chip or NIC (Network Interface Card).

Also, the ground facility 701 may include an optical communication device 210 which performs optical communication as a communication device. The optical communication device 210 has a structure similar to that included in the communication satellite 200 described below.

The control program is read into the processor 910 and executed by the processor 910. In the memory 921, not only the control program but also an OS (Operating System) is stored. The processor 910 executes the control program while executing the OS. The control program and the OS may be stored in the auxiliary storage device. The control program and the OS stored in the auxiliary storage device are loaded into the memory 921 and executed by the processor 910. Note that the entire or part of the control program may be incorporated in the OS.

The ground facility 701 may include a plurality of processors which replace the processor 910. The plurality of these processors share execution of the control program. Each processor is a device which executes the control program, as the processor 910.

Data, information, signal values, and variable values to be used, processed, or outputted by the control program are stored in the memory 921, the auxiliary storage device 922, or a register or cache memory in the processor 910.

The "unit" of the control unit 710 may be read as a "process", "procedure", or "step". Also, the "process" of the control process may be read as a "program", "program product", or "program-recording computer-readable storage medium".

The control program causes a computer to perform each process, each procedure, or each step obtained by reading the "unit" of the control unit as "process", "procedure", or "step". Also, a control method is a method to be performed by the ground facility 701 executing the control program.

The control program may be provided as stored in a computer-readable recording medium or storage medium. Also, the control program may be provided as a program product.

Also, the processor may be replaced as an electronic circuit. The processor and the electronic circuit are each called processing circuitry. That is, the functions of each of devises of an optical communication system, ground facility, communication satellite, surveillance satellite, data relay satellite, and flying object addressing system are implemented by the processing circuitry.

Figure 3:
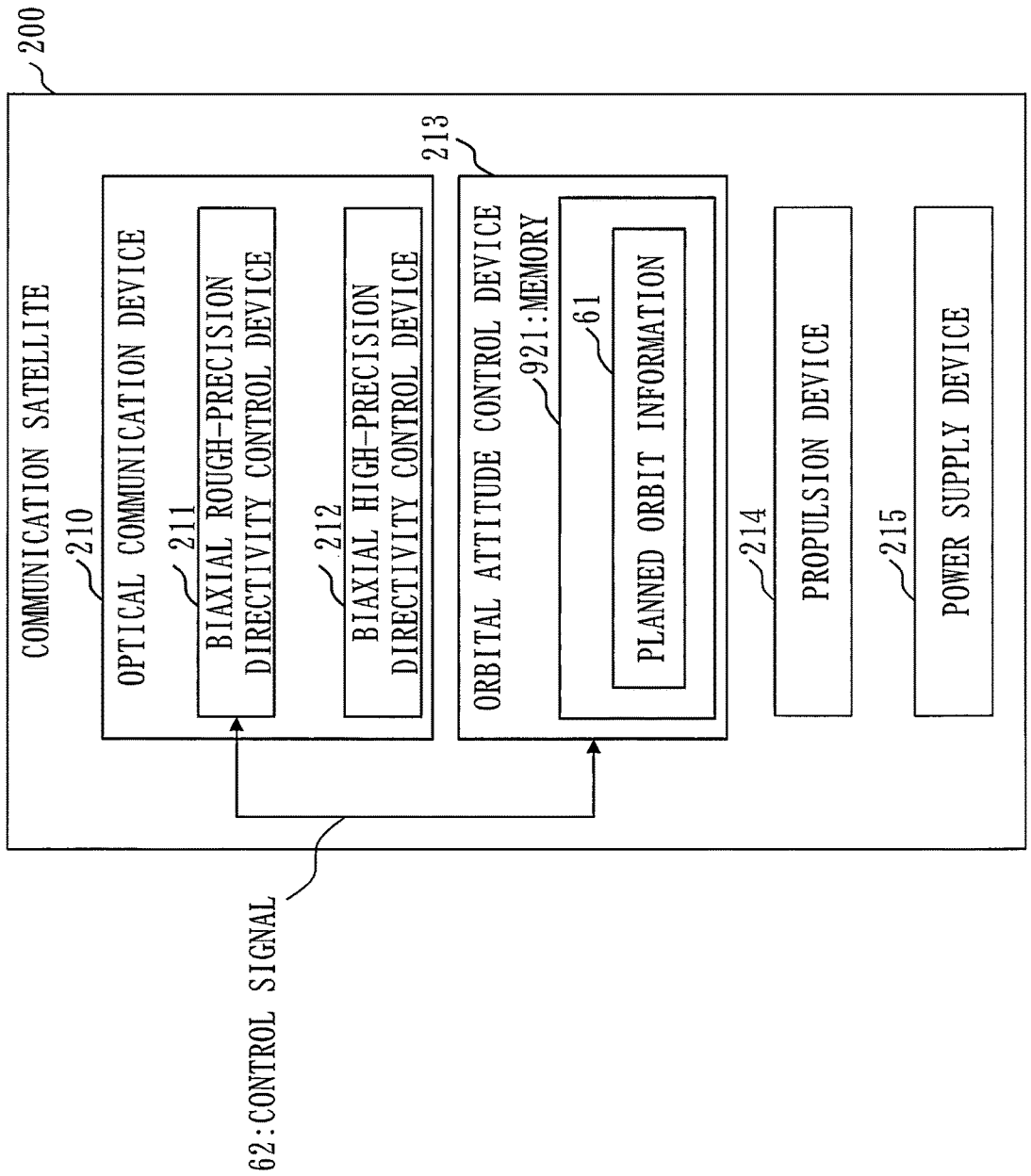
FIG. 3 illustrates an example of structure of a communication satellite according to Embodiment 1.

FIG. 3 illustrates an example of structure of the communication satellite 200 according to the present embodiment.

The communication satellite 200 includes devices such as the optical communication device 210, an orbital attitude control device 213, a propulsion device 214, and a power supply device 215. In addition, it includes devices which achieve various functions.

Figure 4:
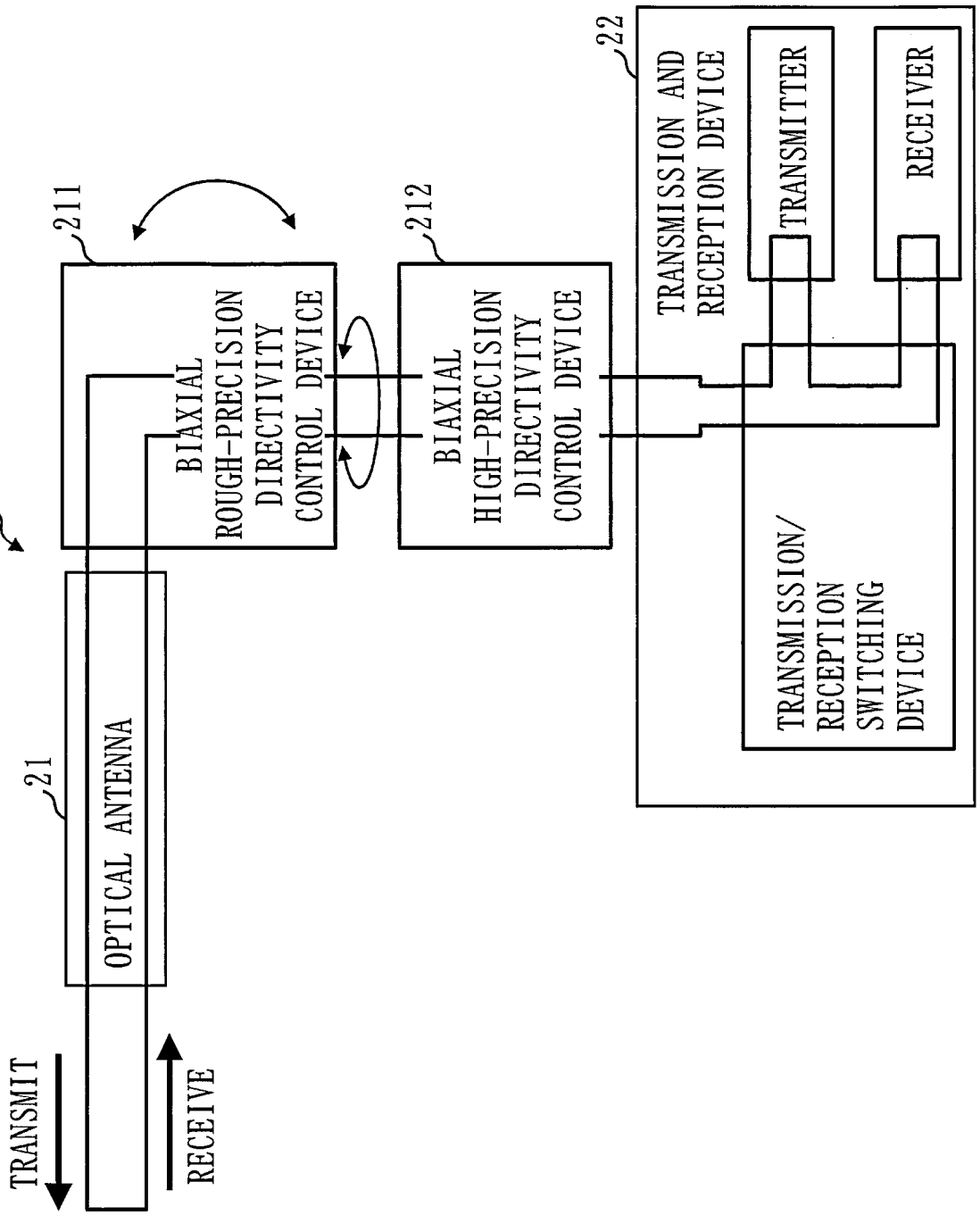
FIG. 4 illustrates an example of detailed structure of an optical communication device according to Embodiment 1.

FIG. 4 is a diagram illustrating an example of detailed structure of the optical communication device 210 according to the present embodiment.

The optical communication device 210 includes a biaxial rough-precision directivity control device 211 and a biaxial high-precision directivity control device 212. Also, the optical communication device 210 includes an optical antenna 21 and the transmission and reception device 22.

The orbital attitude control device 213, for example, transmits a control signal 62 to the biaxial rough-precision directivity control device 211 to control directivity of the optical communication device 210.

The optical communication device 210 performs optical communication with another communication satellite, a movable body, or the ground facility based on the control signal 62.

The orbital attitude control device 213 is a computer which transmits the control signal 62 to the biaxial rough-precision directivity control device 211 to control directivity of the optical communication device 210, and includes the memory 921 and a processing circuit. In the memory 921, information such as planned orbit information 61 of another communication satellite is stored.

The propulsion device 214 is a device which gives propulsion to the communication satellite 200 and changes the speed of the communication satellite 200. Specifically, the communication satellite 200 is an electric propulsion device. As the electric propulsion device, the device is an ion engine or Hall thruster.

The power supply device 215 includes devices such as a solar cell, battery, and power control device to supply electric power to each device mounted on the communication satellite 200.

The processing circuit included in the orbital attitude control device 213 is described.

The processing circuit may be dedicated hardware or a processor which executes a program stored in the memory.

In the processing circuit, part of the functions may be implemented by dedicated hardware and the remaining functions may be implemented by software or firmware. That is, the processing circuit can be implemented by hardware, software, firmware, or a combination of these.

The dedicated hardware is, specifically, a single circuit, composite circuit, programmed processor, parallel-programmed processor, ASIC, FPGA, or a combination of these.

ASIC is an abbreviation for Application Specific Integrated Circuit. FPGA is an abbreviation for Field Programmable Gate Array.

*Description of Optical Communication Scheme*<
<Optical Communication Scheme Example 1 of Optical Communication System>

By using FIG. 1, Optical Communication Scheme Example 1 by three communication satellites 200 according to the present embodiment is described. In FIG. 1, bold solid lines between communication satellites each represent optical communication. Any scheme can be used for communication between the communication satellites and the ground facility indicated by one-dot chain lines.

The optical communication system 500 is configured of three communication satellites 200 each including the optical communication device 210 and the orbital attitude control device 213, and the ground facility 701.

The optical communication device 210 includes the biaxial rough-precision directivity control device 211 and the biaxial high-precision directivity control device 212.

The orbital attitude control device 213 of each communication satellite 200 includes the memory 921 which records the planned orbit information 61 of the three communication satellites 200. The orbital attitude control device 213 exchanges the control signal 62 with the biaxial rough-precision directivity control device 211.

In the optical communication system 500, the first communication satellite 201 flies as performing optical communication simultaneously with the second communication satellite 202 and the third communication satellite 203.

The ground facility 701 transmits, to the first communication satellite 201 and the second communication satellite 202, a command of a time when optical communication starts (communication start time 63).

The orbital attitude control device 213 of the first communication satellite 201 reads, from the memory 921, an orbit position of the second communication satellite 202 at the communication start time. The orbital attitude control device 213 of the first communication satellite 201 transmits the control signal 62 to the biaxial rough-precision directivity control device 211 to cause the optical communication device 210 to be directed to the second communication satellite 202.

The orbital attitude control device 213 of the second communication satellite 202 reads, from the memory 921, an orbit position of the first communication satellite 201 at the communication start time. The orbital attitude control device 213 of the second communication satellite 202 transmits the control signal 62 to the biaxial rough-precision directivity control device 211 to cause the optical communication device 210 to be directed to the first communication satellite 201.

From a state in which the first communication satellite 201 and the second communication satellite 202 are mutually directed to each other with rough precision, the first communication satellite 201 and the second communication satellite 202 each establish a high-precision directivity state by the biaxial high-precision directivity control device 212. Also, as mutually tracked by the biaxial rough-precision directivity control device 211 in accordance with a relative position change based on the planned orbit information 61, the first communication satellite 201 and the second communication satellite 202 each correct a residual directivity error by the biaxial high-precision directivity control device 212.

The ground facility 701 then transmits, to the first communication satellite 201 and the third communication satellite 203, a command of a time when optical communication starts (communication start time 63).

The orbital attitude control device 213 of the first communication satellite 201 reads, from the memory 921, an orbit position of the third communication satellite 203 at the communication start time. The orbital attitude control device 213 of the first communication satellite 201 transmits the control signal 62 to the biaxial rough-precision directivity control device 211 to cause the optical communication device 210 to be directed to the third communication satellite 203.

The orbital attitude control device 213 of the third communication satellite 203 reads, from the memory 921, an orbit position of the first communication satellite 201 at the communication start time. The orbital attitude control device 213 of the third communication satellite 203 transmits the control signal 62 to the biaxial rough-precision directivity control device 211 to cause the optical communication device 210 to be directed to the first communication satellite 201.

From a state in which the first communication satellite 201 and the third communication satellite 203 are mutually directed to each other with rough precision, the first communication satellite 201 and the third communication satellite 203 each establish a high-precision directivity state by the biaxial high-precision directivity control device 212. Also, as mutually tracked by the biaxial rough-precision directivity control device 211 in accordance with a relative position change based on the planned orbit information 61, the first communication satellite 201 and the third communication satellite 203 each correct a residual directivity error by the biaxial high-precision directivity control device 212.

According to Optical Communication Scheme Example 1, an effect is exerted in which when the first communication satellite performs optical communication simultaneously with the second communication satellite and the third communication satellite, a breakdown of communication with a change in directivity direction is inhibited and a highly-stable optical crosslink can be continued.

<Optical Communication Scheme Example 2 of Optical Communication System>

Figure 5:
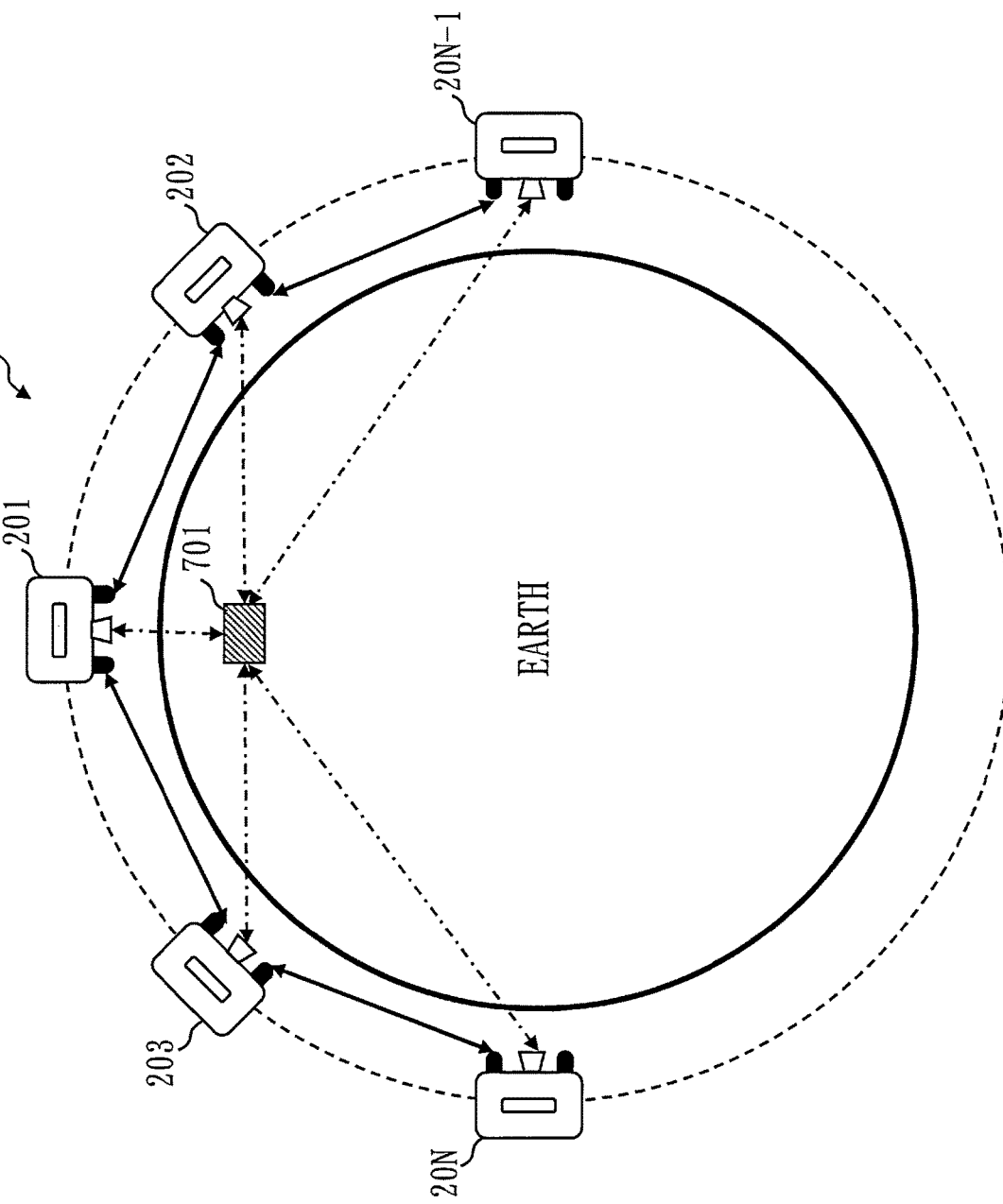
FIG. 5 illustrates an example of structure of an optical communication system adopting Optical Communication Scheme Example 2 according to Embodiment 1.

FIG. 5 illustrates an example of structure of the optical communication system 500 adopting Optical Communication Scheme Example 2 according to the present embodiment.

In the present embodiment, the optical communication system 500 is configured of the first communication satellite 201, N−1 communication satellites from the second communication satellite 202 to an N-th (N is a natural number equal to or more than 3) one, and the ground facility 701. In FIG. 5, the optical communication system 500 is configured of the first communication satellite 201, the second communication satellite 202, the third communication satellite 203, an N−1-th communication satellite 20N−1, an N-th communication satellite 20N, and the ground facility 701.

The orbital attitude control device 213 includes the memory 921 which records planned orbit information 61 of the first communication satellite 201 and flying objects. Here, flying objects include, for example, the N−1 communication satellites from the second communication satellite 202 to the N-th (N is a natural number equal to or more than 3) one.

The first communication satellite 201 flies as performing optical communication simultaneously with the other N−1 communication satellites (that is, from the second communication satellite to the N-th communication satellite). Note that FIG. 5 mainly illustrates a drawing in which initial information is transmitted from the ground facility 701 to the communication satellites and illustrations of optical communication between the first communication satellite 201 and the N−1-th communication satellite 20N−1 and optical communication between the first communication satellite 201 and the N-th communication satellite 20N are omitted.

The first communication satellite 201 includes the memory 921 which records planned orbit information 61 of the other N−1 communication satellites (that is, from the second communication satellite to the N-th communication satellite).

In the present embodiment, the following process is repeated for n from 2 to N. n is a natural number equal to or more than 2 and equal to or less than N.

The n-th communication satellite 20n includes the memory 921 which records planned orbit information 61 of at least the first communication satellite 201 and the n-th communication satellite 20n.

The ground facility 701 transmits, to the first communication satellite 201 and the n-th communication satellite 20n, a command of a time when optical communication starts.

The orbital attitude control device 213 of the first communication satellite 201 reads, from the memory 921, an orbit position of the n-th communication satellite 20n at the communication start time. The orbital attitude control device 213 of the first communication satellite 201 transmits the control signal 62 to the biaxial rough-precision directivity control device 211 to cause the optical communication device to be directed to the n-th communication satellite 20n.

The orbital attitude control device 213 of the n-th communication satellite 20n reads, from the memory 921, an orbit position of the first communication satellite 201 at the communication start time. The orbital attitude control device 213 of the n-th communication satellite 20n transmits the control signal 62 to the biaxial rough-precision directivity control device 211 to cause the optical communication device 210 to be directed to the first communication satellite 201.

From a state in which the first communication satellite 201 and the n-th communication satellite 20n are mutually directed to each other with rough precision, the first communication satellite 201 and the n-th communication satellite 20n each establish a high-precision directivity state by the biaxial high-precision directivity control device 212.

As mutually tracked by the biaxial rough-precision directivity control device 211 in accordance with a relative position change based on the planned orbit information 61, the first communication satellite 201 and the n-th communication satellite 20n each correct a residual directivity error by the biaxial high-precision directivity control device 212.

With the above process repeated for n from 2 to N, the first communication satellite 201 can fly as performing optical communication simultaneously with the other N−1 communication satellites (that is, from the second communication satellite to the N-th communication satellite). Also, an effect is exerted in which when the first communication satellite 201 performs optical communication simultaneously with the other N−1 communication satellites, a breakdown of communication with a change in directivity direction is inhibited and a highly-stable optical crosslink can be continued.

<Optical Communication Scheme Example 3 of Optical Communication System>

Figure 6:
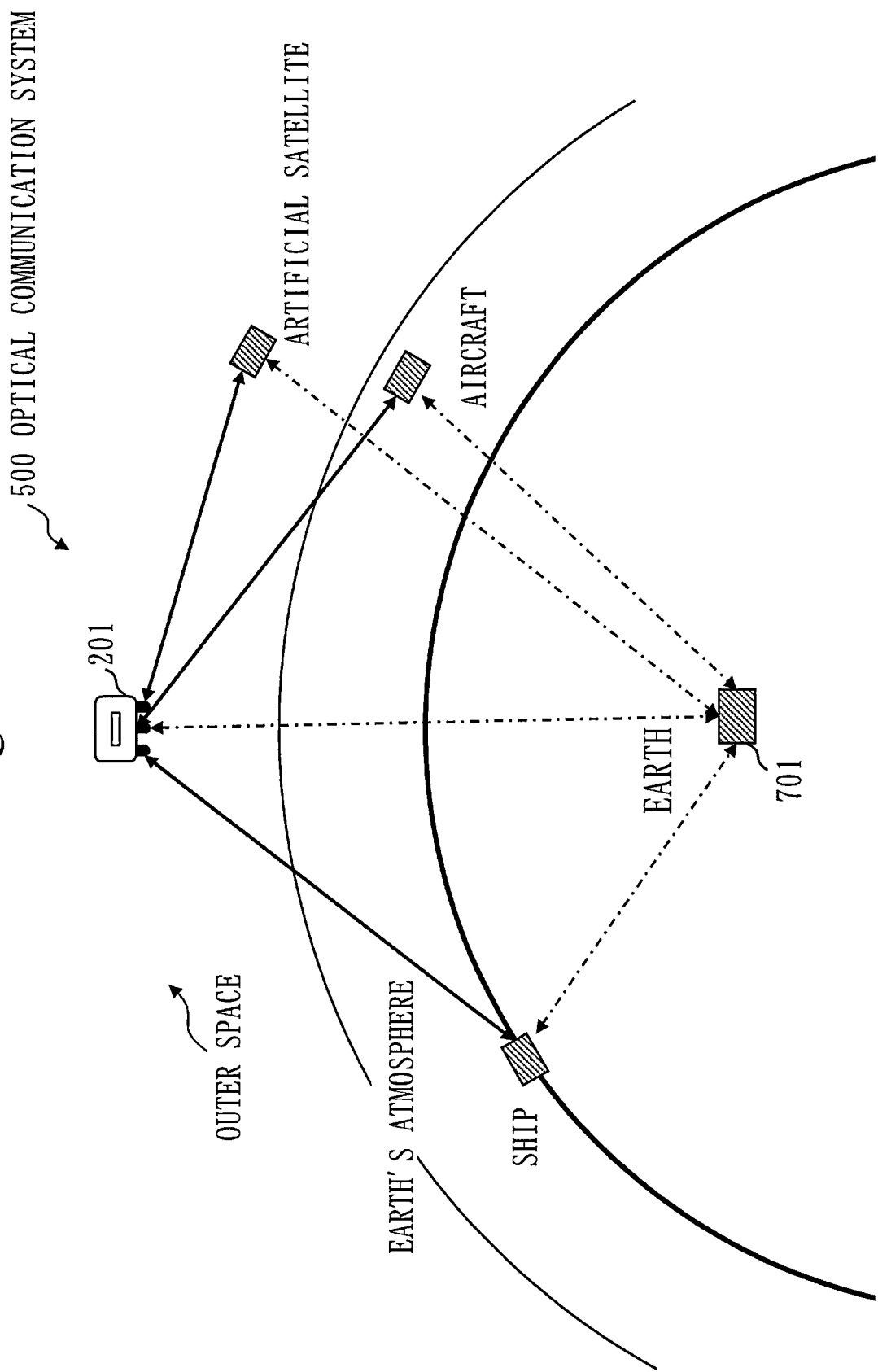
FIG. 6 illustrates an example of structure of an optical communication system adopting Optical Communication Scheme Example 3 according to Embodiment 1.

FIG. 6 illustrates an example of structure of the optical communication system 500 adopting Optical Communication Scheme Example 3 according to the present embodiment.

The optical communication system 500 is configured of the first communication satellite 201, N movable bodies, and the ground facility 701.

The first communication satellite 201 includes the optical communication device 210 and the orbital attitude control device 213.

Each of the N movable bodies includes the optical communication device 210 and the orbital attitude control device 213.

Each of the N movable bodies is a movable body such as an artificial satellite, aircraft, or ship.

In FIG. 6, the optical communication system 500 is configured of the first communication satellite 201, three movable bodies, and the ground facility 701.

The orbital attitude control device 213 includes the memory 921 which records planned orbit information 61 of the first communication satellite 201 and the movable body. The orbital attitude control device 213 carries out an exchange of the control signal 62 with the biaxial rough-precision directivity control device 211.

The first communication satellite 201 flies as performing optical communication simultaneously with the other N movable bodies.

The first communication satellite 201 includes the memory 921 which records planned orbit information 61 or position information of the N movable bodies.

An n-th (n is a natural number equal to or less than N) movable body includes the memory 921 which records planned orbit information or position information of at least the first communication satellite 201 and the n-th movable body.

In the present embodiment, the following process is repeated for n from 1 to N.

The ground facility 701 transmits, to the first communication satellite 201 and the n-th movable body, a command of a time when optical communication starts.

The orbital attitude control device 213 of the first communication satellite 201 reads, from the memory 921 included in the orbital attitude control device 213 of the first communication satellite 201, position information of the n-th movable body at the communication start time. The orbital attitude control device 213 of the first communication satellite 201 transmits the control signal 62 to the biaxial rough-precision directivity control device 211 to cause the optical communication device 210 to be directed to the n-th movable body.

The orbital attitude control device 213 of the n-th movable body reads, from the memory 921 included in the orbital attitude control device 213 of the n-th movable body, an orbit position of the first communication satellite 201 at the communication start time. The orbital attitude control device 213 of the n-th movable body transmits the control signal 62 to the biaxial rough-precision directivity control device 211 to cause the optical communication device 210 to be directed to the first communication satellite 201.

From a state in which the first communication satellite 201 and the n-th movable body are mutually directed to each other with rough precision, each establishes a high-precision directivity state by the biaxial high-precision directivity control device 212. Also, as mutually tracked by the biaxial rough-precision directivity control device 211 in accordance with a relative position change based on the planned orbit information 61, the first communication satellite 201 and the n-th movable body each correct a residual directivity error by the biaxial high-precision directivity control device 212.

With the above process repeated for n from 1 to N, the first communication satellite 201 can fly as performing optical communication simultaneously with the other N movable bodies. Also, an effect is exerted in which when the first communication satellite 201 performs optical communication simultaneously with the other N movable bodies, a breakdown of communication with a change in directivity direction is inhibited and a highly-stable optical crosslink can be continued.

<Optical Communication Scheme Example 4 of Optical Communication System>

Figure 7:
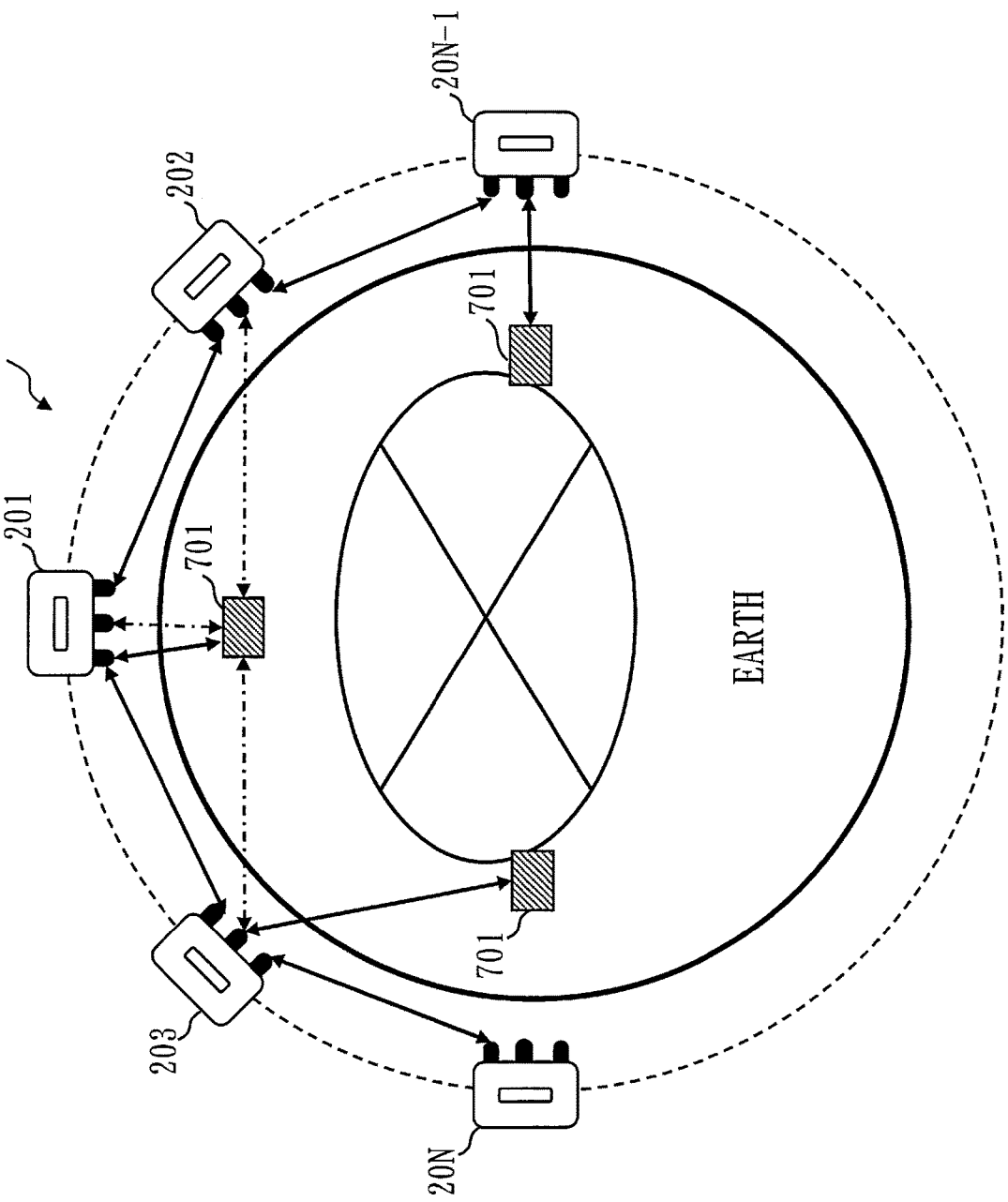
FIG. 7 illustrates an example of structure of an optical communication system adopting Optical Communication Scheme Example 4 according to Embodiment 1.

FIG. 7 illustrates an example of structure of the optical communication system 500 adopting Optical Communication Scheme Example 4 according to the present embodiment.

In the present embodiment, the optical communication system 500 is configured of the first communication satellite 201, N−1 communication satellites from the second communication satellite 202 to an N-th (N is a natural number equal to or more than 3) one, and the ground facilities 701.

The ground facility 701 includes the optical communication device 210.

In FIG. 7, the optical communication system 500 is configured of the first communication satellite 201, the second communication satellite 202, the third communication satellite 203, the N−1-th communication satellite 20N−1, the N-th communication satellite 20N, and three ground facilities 701.

The optical communication device 210 includes the biaxial rough-precision directivity control device 211 and the biaxial high-precision directivity control device 212.

The orbital attitude control device 213 includes the memory 921 which records planned orbit information 61 of the first communication satellite 201 and the other communication satellites and position coordinates of the ground facility 701. The orbital attitude control device 213 carries out an exchange of the control signal 62 with the biaxial rough-precision directivity control device 211.

The first communication satellite 201 flies as performing optical communication simultaneously with the other N−1 communication satellites. Note that FIG. 7 mainly illustrates a drawing in which initial information is transmitted from each ground facility 701 to the communication satellite and illustrations of optical communication between the first communication satellite 201 and the N−1-th communication satellite 20N−1 and optical communication between the first communication satellite 201 and the N-th communication satellite 20N are omitted.

The ground facility 701 transmits, to the first communication satellite 201, a command of the position coordinates of the ground facility 701 and a time when optical communication starts.

The orbital attitude control device 213 of the first communication satellite 201 reads, from the memory 921 included in the orbital attitude control device 213 of the first communication satellite 201, position coordinates of the ground facility 701 at the communication start time. The orbital attitude control device 213 of the first communication satellite 201 transmits the control signal 62 to the biaxial rough-precision directivity control device 211 to cause the optical communication device 210 to be directed to the ground facility 701.

The ground facility 701 transmits the control signal 62 to the biaxial rough-precision directivity control device 211 to cause the optical communication device 210 to be directed to the first communication satellite 201.

From a state in which the first communication satellite 201 and the ground facility 701 are mutually directed to each other with rough precision, each establishes a high-precision directivity state by the biaxial high-precision directivity control device 212. Also, as mutually tracked by the biaxial rough-precision directivity control device 211 in accordance with a relative position change based on the planned orbit information 61, the first communication satellite 201 and the ground facility 701 each correct a residual directivity error by the biaxial high-precision directivity control device 212.

Furthermore, the first communication satellite 201 includes the memory 921 which records planned orbit information 61 of the N−1 communication satellites from the second communication satellite 202 to the N-th (N is a natural number equal to or more than 3) communication satellite 20N.

The n-th communication satellite 20n includes the memory 921 which records planned orbit information 61 of at least the first communication satellite 201 and the n-th communication satellite 20n.

The ground facility 701 transmits, to the first communication satellite 201 and the n-th communication satellite 20n, a command of a time when optical communication starts.

In the present embodiment, the following process is repeated for n from 2 to N.

The orbital attitude control device 213 of the first communication satellite 201 reads, from the memory 921 included in the orbital attitude control device 213 of the first communication satellite 201, an orbit position of the n-th communication satellite 20n at the communication start time. The orbital attitude control device 213 of the first communication satellite 201 transmits the control signal 62 to the biaxial rough-precision directivity control device 211 to cause the optical communication device 210 to be directed to the n-th communication satellite 20n.

The orbital attitude control device 213 of the n-th communication satellite 20n reads, from the memory 921 included in the orbital attitude control device 213 of the n-th communication satellite 20n, an orbit position of the first communication satellite 201 at the communication start time. The orbital attitude control device 213 of the n-th communication satellite 20n transmits the control signal 62 to the biaxial rough-precision directivity control device 211 to cause the optical communication device 210 to be directed to the first communication satellite 201.

From a state in which the first communication satellite 201 and the n-th communication satellite 20n are mutually directed to each other with rough precision, each establishes a high-precision directivity state by the biaxial high-precision directivity control device 212. Also, as mutually tracked by the biaxial rough-precision directivity control device 211 in accordance with a relative position change based on the planned orbit information 61, the first communication satellite 201 and the n-th communication satellite 20n each correct a residual directivity error by the biaxial high-precision directivity control device 212.

With the above process repeated for n from 2 to N, the first communication satellite 201 can fly as performing optical communication simultaneously with the other N−1 communication satellites. Also, an effect is exerted in which when the first communication satellite 201 performs optical communication simultaneously with the other N−1 communication satellites, a breakdown of communication with a change in directivity direction is inhibited and a highly-stable optical crosslink can be continued.

<Optical Communication Scheme Example 5 of Optical Communication System>

Figure 8:
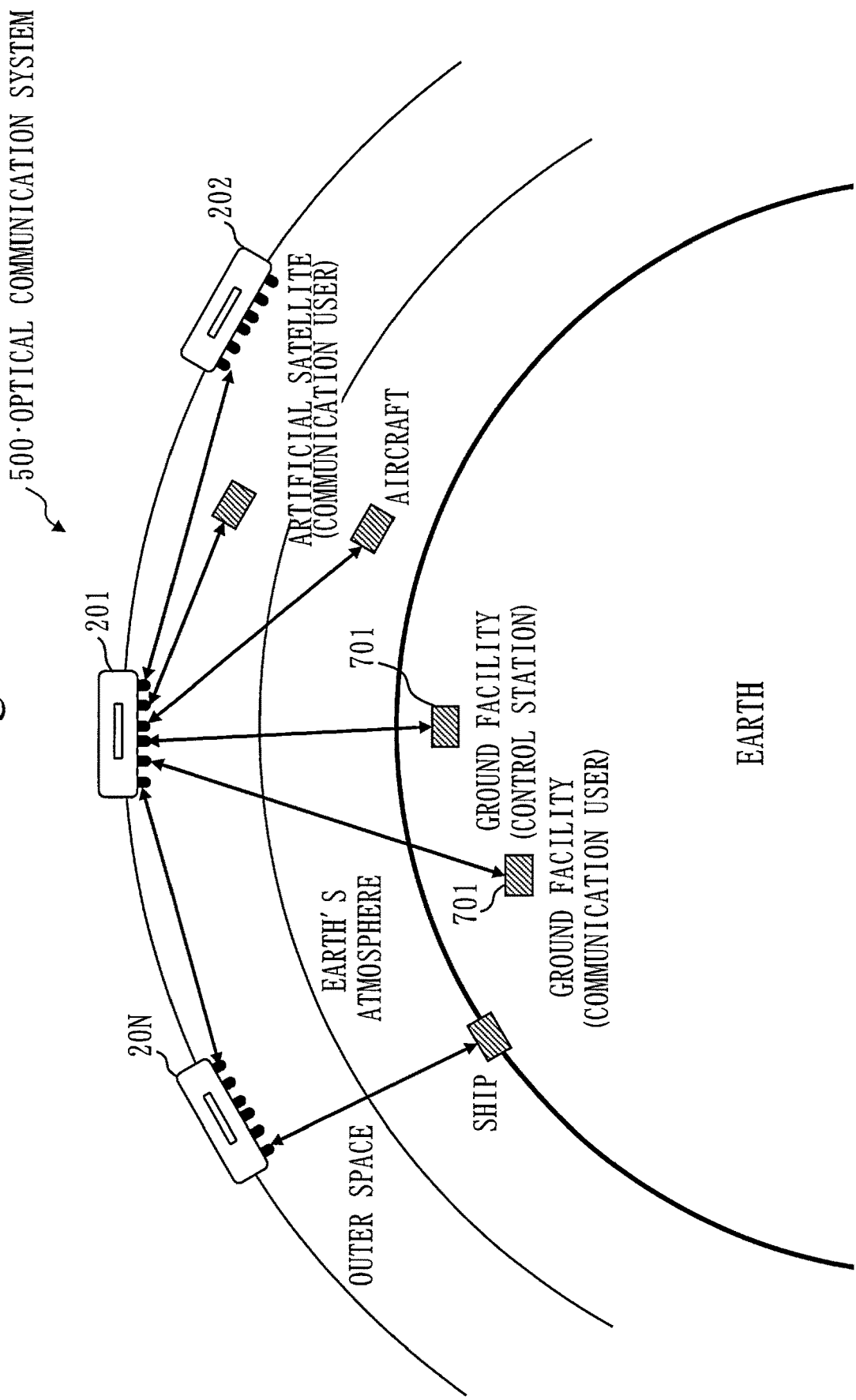
FIG. 8 illustrates an example of structure of an optical communication system adopting Optical Communication Scheme Example 5 according to Embodiment 1.

FIG. 8 illustrates an example of structure of the optical communication system 500 adopting Optical Communication Scheme Example 5 according to the present embodiment.

The optical communication system 500 is configured of the first communication satellite 201, N−1 communication satellites from the second to N-th (N is a natural number equal to or more than 3) ones, M flying objects, and ground facilities. Here, M is a natural number.

The first communication satellite 201 includes the optical communication device 210 and the orbital attitude control device 213.

Each of the N−1 communication satellites includes the optical communication device 210 and the orbital attitude control device 213.

Each of the M flying objects includes the optical communication device 210 and the orbital attitude control device 213.

Each ground facility 701 includes the optical communication device 210.

Each of the M flying objects is a flying object such as an artificial satellite or aircraft. Also, as in Optical Communication Scheme Example 3, the flying object may be a movable body including a ship.

In FIG. 8, the optical communication system 500 is configured of the first, second, and N-th communication satellites, three flying objects, and two ground facilities (control station, communication user).

The optical communication device 210 includes the biaxial rough-precision directivity control device 211 and the biaxial high-precision directivity control device 212.

The orbital attitude control device 213 includes the memory 921 which records planned orbit information 61 of the communication satellite and the flying objects and position coordinates of the ground facilities 701. The orbital attitude control device 213 carries out an exchange of the control signal 62 with the biaxial rough-precision directivity control device 211.

The first communication satellite 201 flies as performing optical communication simultaneously with the other N−1 communication satellites. Also, the first communication satellite 201 flies as performing optical communication simultaneously with the M flying objects.

The ground facility 701 transmits, to the first communication satellite 201, a command of the position coordinates of the ground facility 701 and a time when optical communication stars.

The orbital attitude control device 213 of the first communication satellite 201 reads, from the memory 921 included in the orbital attitude control device 213 of the first communication satellite 201, position coordinates of the ground facility 701 at the communication start time. The orbital attitude control device 213 of the first communication satellite 201 transmits the control signal 62 to the biaxial rough-precision directivity control device 211 to cause the optical communication device 210 to be directed to the ground facility 701.

The ground facility 701 transmits the control signal 62 to the biaxial rough-precision directivity control device 211 to cause the optical communication device 210 to be directed to the first communication satellite 201.

From a state in which the first communication satellite 201 and the ground facility 701 are mutually directed to each other with rough precision, each establishes a high-precision directivity state by the biaxial high-precision directivity control device 212. Also, as mutually tracked by the biaxial rough-precision directivity control device 211 in accordance with a relative position change based on the planned orbit information 61, the first communication satellite 201 and the ground facility 701 each correct a residual directivity error by the biaxial high-precision directivity control device 212.

Furthermore, the first communication satellite 201 includes the memory 921 which records planned orbit information 61 of the N−1 communication satellites from the second communication satellite 202 to the N-th (N is a natural number equal to or more than 3) communication satellite 20N.

The n-th communication satellite 20n includes the memory 921 which records planned orbit information 61 of at least the first communication satellite 201 and the n-th communication satellite 20n.

The ground facility 701 transmits, to the first communication satellite 201 and the n-th communication satellite 20n, a command of a time when optical communication starts.

Furthermore, the following process is repeated for n from 2 to N. n is a natural number equal to or more than 2 and equal to or less than N.

The orbital attitude control device 213 of the first communication satellite 201 reads, from the memory 921 included in the orbital attitude control device 213 of the first communication satellite 201, an orbit position of the n-th communication satellite 20n at the communication start time. The orbital attitude control device 213 of the first communication satellite 201 transmits the control signal 62 to the biaxial rough-precision directivity control device 211 to cause the optical communication device 210 to be directed to the n-th communication satellite 20n.

The orbital attitude control device 213 of the n-th communication satellite 20n reads, from the memory 921 included in the orbital attitude control device 213 of the n-th communication satellite 20n, an orbit position of the first communication satellite 201 at the communication start time. The orbital attitude control device 213 of the n-th communication satellite 20n transmits the control signal 62 to the biaxial rough-precision directivity control device 211 to cause the optical communication device 210 to be directed to the first communication satellite 201.

From a state in which the first communication satellite 201 and the n-th communication satellite 20n are mutually directed to each other with rough precision, each establishes a high-precision directivity state by the biaxial high-precision directivity control device 212. Also, as mutually tracked by the biaxial rough-precision directivity control device 211 in accordance with a relative position change based on the planned orbit information 61, the first communication satellite 201 and the n-th communication satellite 20n each correct a residual directivity error by the biaxial high-precision directivity control device 212.

The above process is repeated for n from 2 to N.

The first communication satellite 201 includes the memory 921 which records planned orbit information 61 or position information of the M flying objects.

An m-th flying object includes the memory 921 which records planned orbit information 61 or position information of at least the first communication satellite 201 and the m-th flying object. m is a natural number from 1 to M.

The ground facility 701 transmits, to the first communication satellite 201 and the m-th flying object, a command of a time when optical communication starts.

Furthermore, the following process is repeated for m from 1 to M.

The orbital attitude control device 213 of the first communication satellite 201 reads, from the memory 921 included in the orbital attitude control device 213 of the first communication satellite 201, position information of the m-th flying object at the communication start time. The orbital attitude control device 213 of the first communication satellite 201 transmits the control signal 62 to the biaxial rough-precision directivity control device 211 to cause the optical communication device 210 to be directed to the m-th flying object.

The orbital attitude control device 213 of the m-th flying object reads, from the memory 921 included in the orbital attitude control device 213 of the m-th flying object, an orbit position of the first communication satellite 201 at the communication start time. The orbital attitude control device 213 of the m-th flying object transmits the control signal 62 to the biaxial rough-precision directivity control device 211 to cause the optical communication device 210 to be directed to the first communication satellite 201.

From a state in which the first communication satellite 201 and the m-th flying object are mutually directed to each other with rough precision, each establishes a high-precision directivity state by the biaxial high-precision directivity control device 212. Also, as mutually tracked by the biaxial rough-precision directivity control device 211 in accordance with a relative position change based on the planned orbit information or the position information, the first communication satellite 201 and the m-th flying object each correct a residual directivity error by the biaxial high-precision directivity control device 212.

The above process is repeated for m from 1 to M.

By Optical Communication Scheme Example 5 of the optical communication system 500, the first communication satellite 201 can fly as performing optical communication simultaneously with the other N−1 communication satellites and the M flying objects. Also, an effect is exerted in which when the first communication satellite 201 performs optical communication simultaneously with the other N−1 communication satellites and the M flying objects, a breakdown of communication with a change in directivity direction is inhibited and a highly-stable optical crosslink can be continued.

Embodiment 2

In the present embodiment, points to be added to or different from Embodiment 1 are mainly described. Note that a structure similar to that of Embodiment 1 is provided with the same reference character and its description may be omitted.

In the present embodiment, variations of the optical communication scheme described in Embodiment 1 are described.

Variation 1

The ground facility 701 transmits orbit information of communication satellites 200 which perform optical communication with each other to each of the communication satellites 200.

Each of the orbital attitude control devices 213 which perform optical communication with each other makes an angular conversion of a change in a relative position relation with the communication satellite as a communication target to control the biaxial rough-precision directivity control device 211.

When optical communication is first performed, the latest orbit information of each of the communication satellites is transmitted from the ground facility 701 and a command of optical communication start timing is provided, thereby allowing appropriate directivity direction control of optical communication beams.

Variation 2

The ground facility 701 transmits relative position information of communication satellites 200 which perform optical communication with each other to each of the communication satellites 200. The ground facility 701 transmits relative position information in angular conversion.

Each of the orbital attitude control devices 213 which perform optical communication with each other makes an angular conversion of a change in a relative position relation with the communication satellite as a communication target to control the biaxial rough-precision directivity control device 211.

Figure 9:
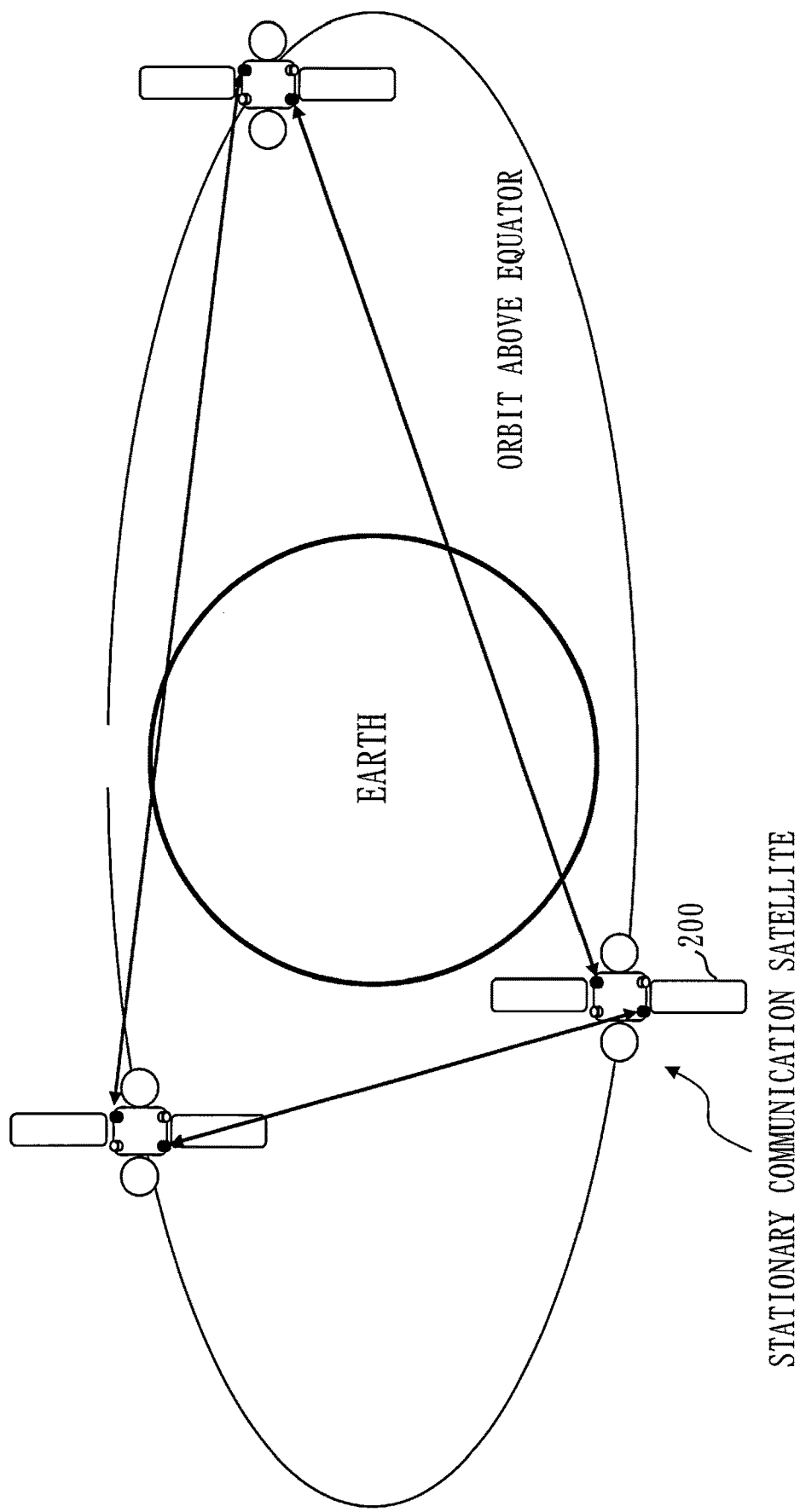
FIG. 9 illustrates an example of effects of Variation 2 of an optical communication scheme according to Embodiment 2.

FIG. 9 is a diagram for describing an example of effects of Variation 2 of the optical communication scheme according to the present embodiment.

In optical communication between stationary communication satellites flying over approximately 36000 km above the equator, position coordinates at the time of routine operation are hardly changed in the earth-fixed coordinate system. Therefore, transmitting the relative position information in angular conversion has an effect of minimizing the amount of information and also decreasing the frequency of information updates.

Figure 10:
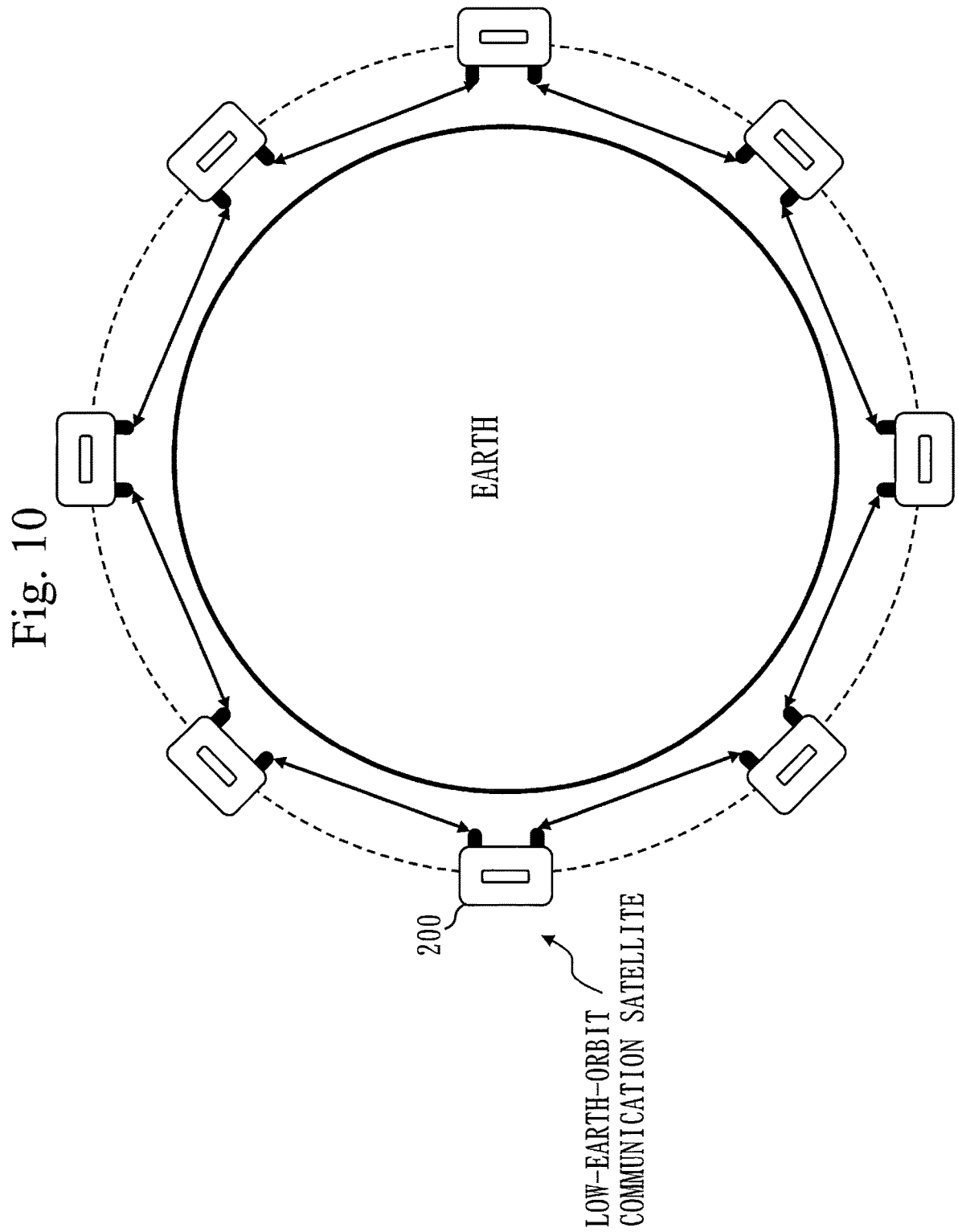
FIG. 10 illustrates another example of the effects of Variation 2 of the optical communication scheme according to Embodiment 2.

FIG. 10 is a diagram for describing another example of the effects of Variation 2 of the optical communication scheme according to the present embodiment.

When many low-earth-orbit communication satellites fly on the same orbital plane in uniform phase arrangement and front and rear communication satellites on the same orbital plane perform optical communication, the relative positions at the time of routine operation are hardly changed. Therefore, transmitting the relative position information at the time of routine operation in angular conversion has an effect of minimizing the amount of information and also decreasing the frequency of information updates.

Variation 3

Communication satellites which perform optical communication with each other exchange each orbit information via optical communication. Each orbital attitude control device 213 makes an angular conversion of a change in a relative position relation with the communication satellite as a communication target to control the biaxial rough-precision directivity control device 211.

Figure 11:
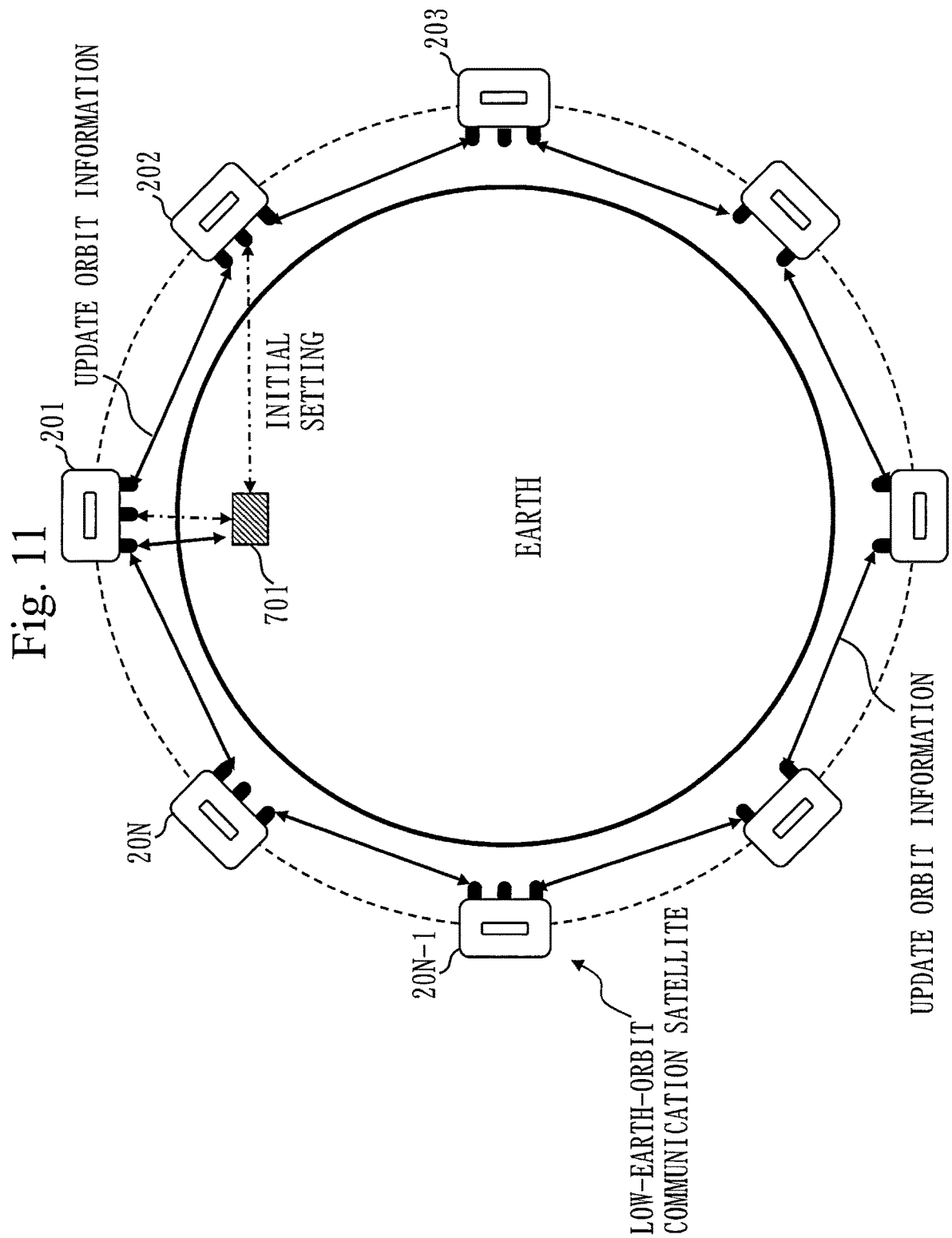
FIG. 11 illustrates an example of effects of Variation 3 of the optical communication scheme according to Embodiment 2.

FIG. 11 is a diagram for describing an example of effects of Variation 3 of the optical communication scheme according to the present embodiment.

Control via the ground facility 701 is suitable to a case in which continuous communication with the ground facility is always enabled, as is the case of stationary satellites. However, there is a problem in which, as is the case of low-earth-orbit communication satellites, for communication satellites passing over a specific ground facility 701 in a short time, it is not possible to exchange a control signal at any timing.

Thus, at an initial stage of operation, a command of orbit information of each communication satellites and timing of starting optical communication is transmitted from the ground facility 701. After optical communication between the communication satellites is established, each orbit information is exchanged between the communication satellites, and an angular conversion of a change in a relative position relation is performed to control the biaxial rough-precision directivity control device 211. This has an effect of allowing appropriate directivity control and continuous breakdown-free optical communication without intervention of the ground facility 701.

Variation 4

The communication satellites 200 each include an electric propulsion device. Communication satellites each exchange, via optical communication, control parameter information of the orbital attitude control device 213 with its electric propulsion device has been operated, and each orbital attitude control device 213 makes an angular conversion of a change in a relative position relation with the communication target to control the biaxial rough-precision directivity control device 211.

Figure 12:
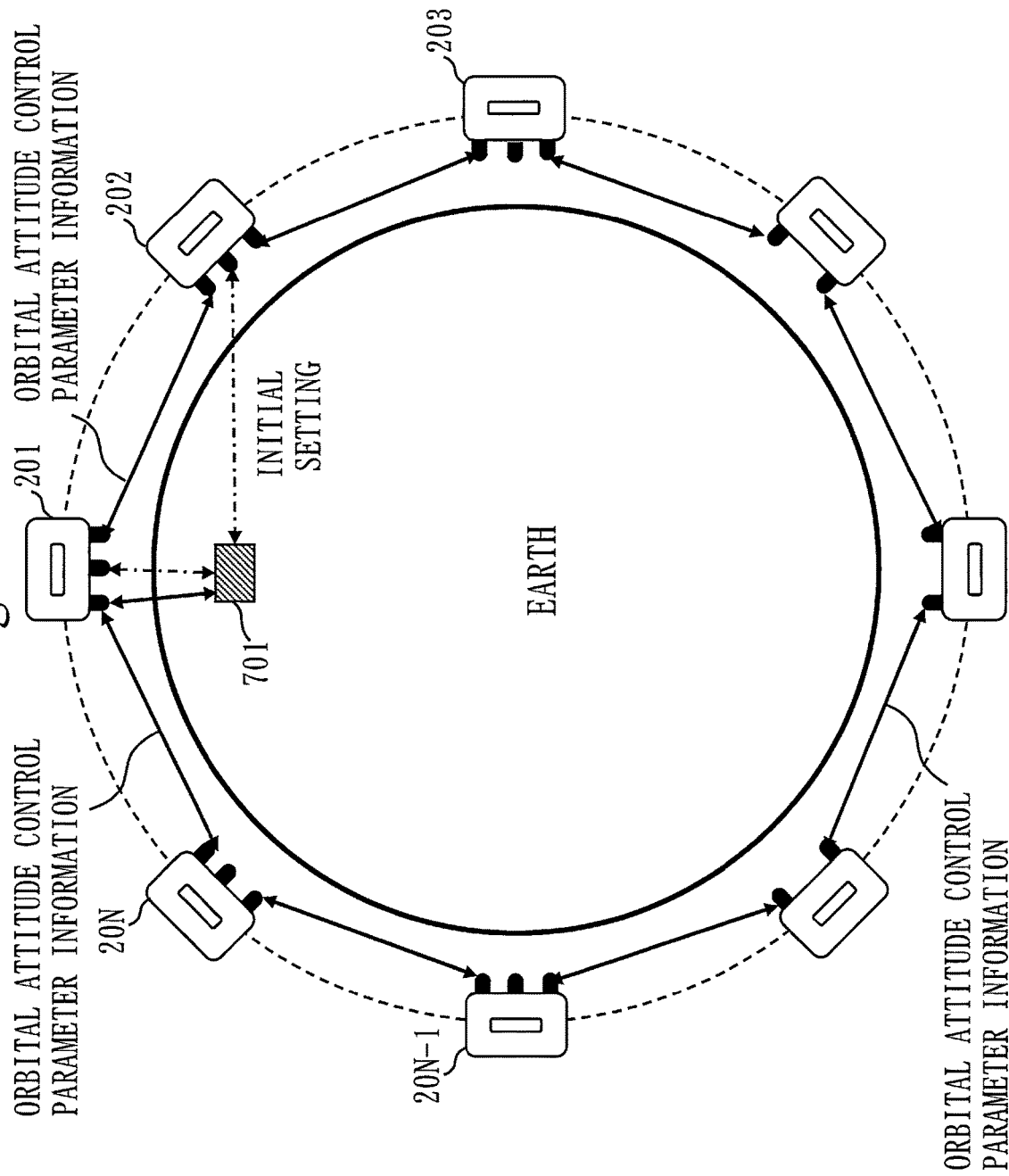
FIG. 12 illustrates an example of effects of Variation 4 of the optical communication scheme according to Embodiment 2.

FIG. 12 is a diagram for describing an example of effects of Variation 4 of the optical communication scheme according to the present embodiment.

The electric propulsion device has small propulsion. Thus, exchanging control parameters with the communication counterpart has an effect in which it is possible to ensure allowance in time for making an angular conversion of the change in the relative position relation with the communication target to control the biaxial rough-precision directivity control device 211 and appropriately follow the directivity direction. Thus, this has an effect in which optical communication is not broken even if the target satellite operates the propulsion device.

Variation 5

The communication satellites 200 each include an electric propulsion device. Communication satellites each exchange, via optical communication, control parameter information of the orbital attitude control device 213 with its electric propulsion device has been operated, and transmit it to the ground facility 701.

The ground facility 701 collectively manages operating conditions of the propulsion devices of all communication satellites to perform management of satellite constellation operation. The ground facility 701 transmits orbit information of all communication satellites to a communication satellite flying in a communication visual field range, and transmits the orbit information to all communication satellites via an optical communication circuit among the communication satellites.

The orbital attitude control devices 213 each make an angular conversion of a change in a relative position relation with a communication target to control the biaxial rough-precision directivity control device 211.

Figure 13:
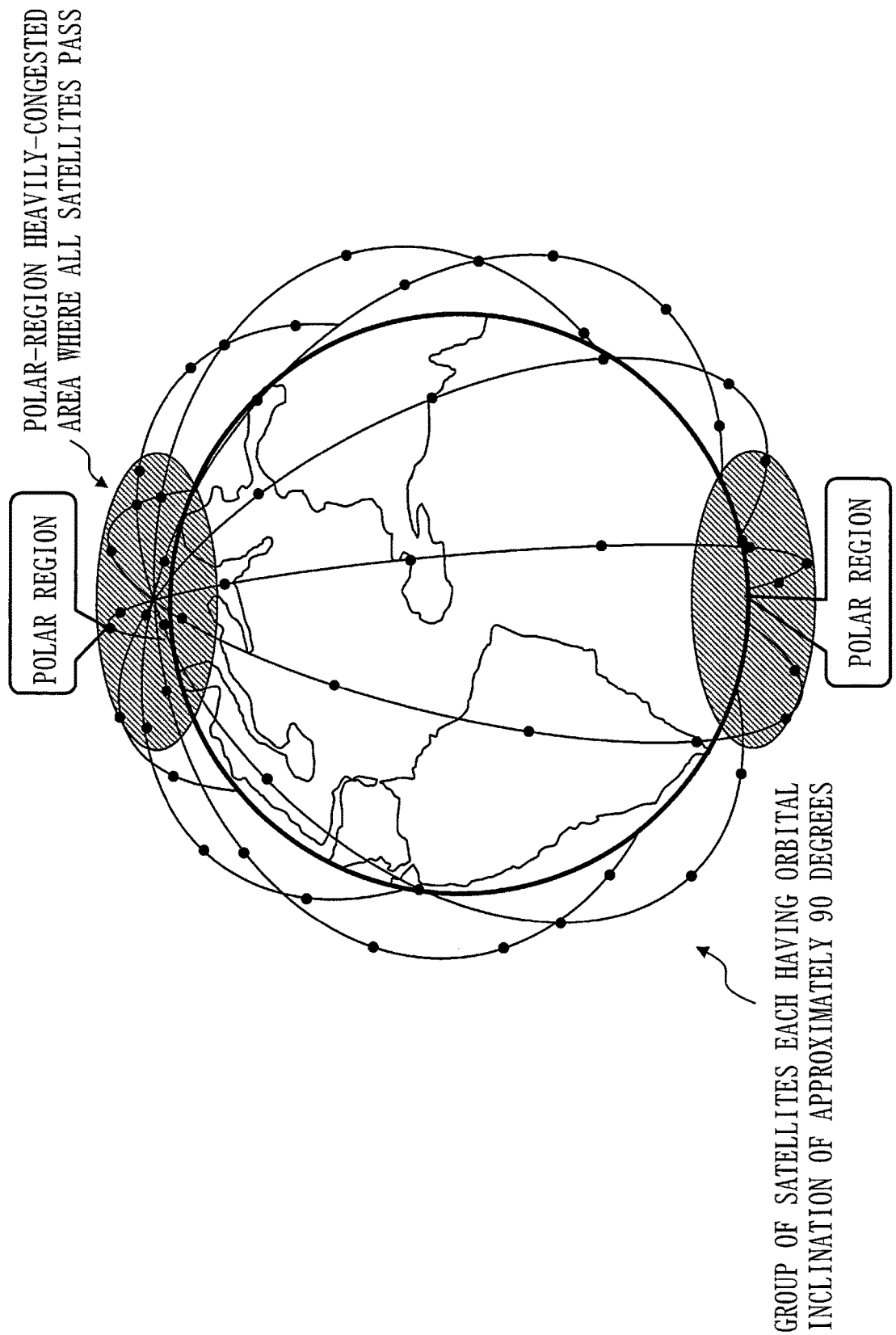
FIG. 13 illustrates a mega-constellation by polar orbit satellites according to Embodiment 2.

FIG. 13 is a diagram for describing a mega-constellation by polar orbit satellites according to the present embodiment.

Operation control of a mega-constellation configured of many orbital planes where many machines are arranged on one orbital plane requires strict operation control for avoiding collisions in its own system.

In the mega-constellation by polar orbit satellites, since all satellites pass over polar regions, management of timings of passing over the polar regions is important. For strict control of passing timings, all satellites operate their propulsion devices. Thus, orbital errors accumulate unless the orbit information is updated on a real-time basis.

Figure 14:
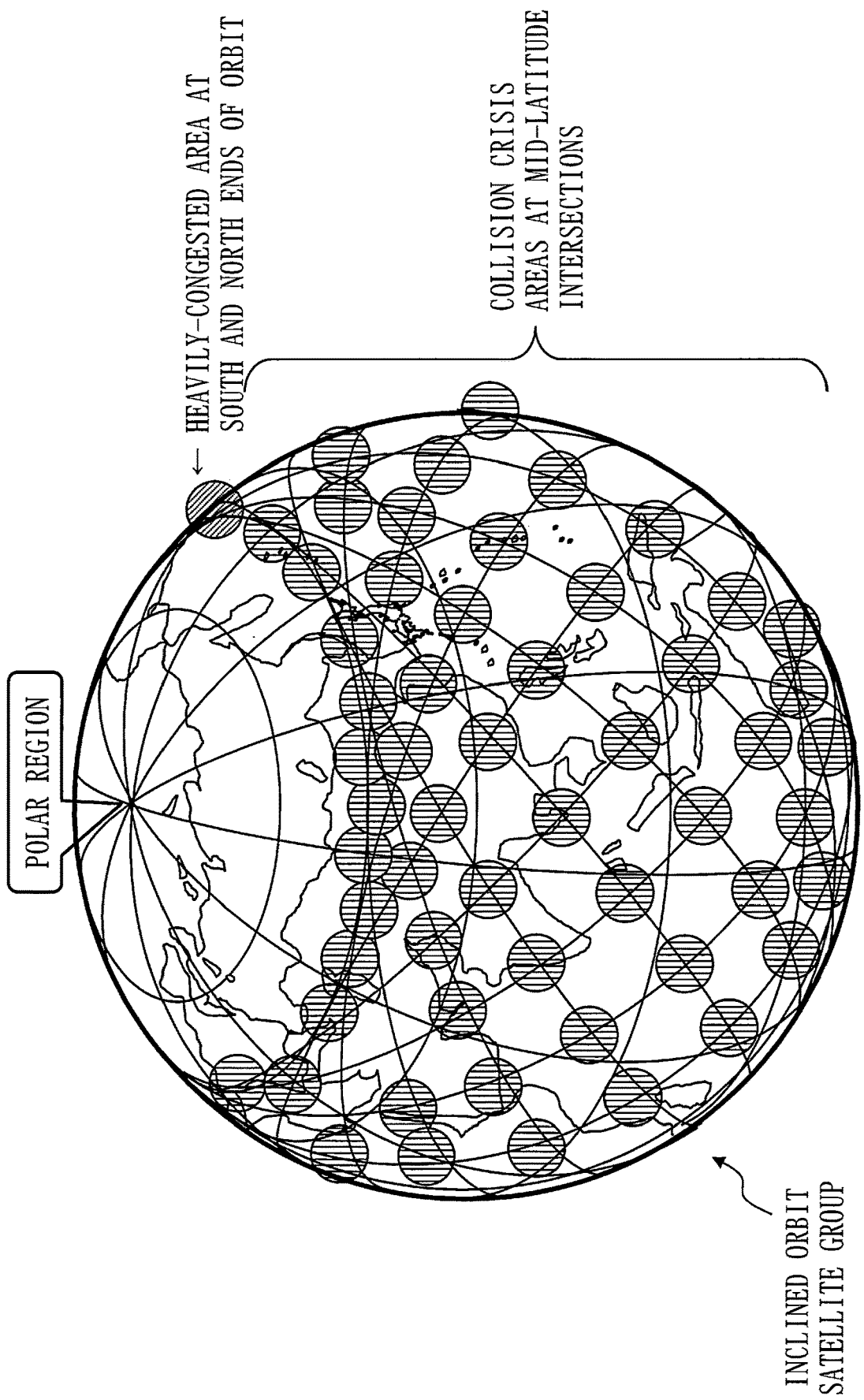
FIG. 14 illustrates a mega-constellation by inclined orbit satellites according to Embodiment 2.

FIG. 14 is a diagram for describing a mega-constellation by inclined orbit satellites according to the present embodiment.

In the mega-constellation by inclined orbit satellites, while heavy congestion in the polar regions can be avoided, many intersections of orbital planes occur in mid-latitude regions. Thus, for strict control of passing timings so as to avoid occurrence of collisions at all intersections, it is required for all satellites to operate their propulsion devices. Thus, orbital errors accumulate unless the orbit information is updated on a real-time basis.

Figure 15:
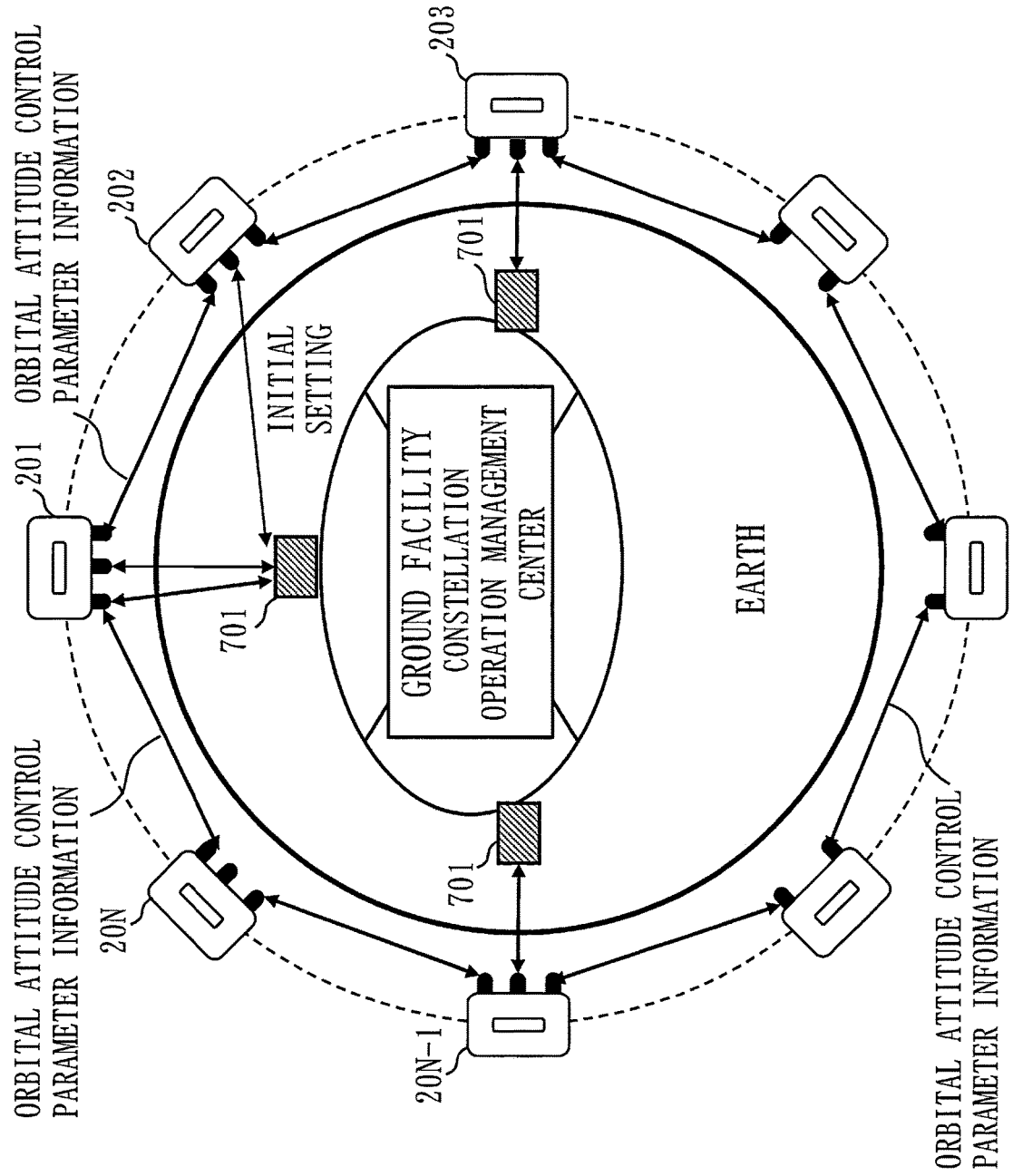
FIG. 15 illustrates an example of effects of Variation 5 of the optical communication scheme according to Embodiment 2.

FIG. 15 is a diagram for describing an example of effects of Variation 5 of the optical communication scheme according to the present embodiment.

As described in FIG. 13 and FIG. 14, in mega-constellation operation control, it is rational to collectively manage all satellites in a centralized manner so as to avoid collisions.

In a low-earth-orbit communication satellite constellation, communication satellites capable of ensuring a communication visual field with a specific ground facility are limited. However, as illustrated in FIG. 15, if a communication network is established in orbit, it is possible to transmit the orbit information to all communication satellites via inter-satellite communication.

To suppress a residual error with operation of a biaxial rough-precision directivity direction changing device, sharing highly-accurate planned orbit information or position information is imperative.

For example, in three satellites in a stationary orbit, if one stationary satellite performs optical communication with another stationary satellite, fluctuations in relative position with elapse of time are sufficiently small. Thus, it is possible to share the planned orbit information with high accuracy.

By contrast, when an optical crosslink is adopted in a mega-constellation conception configured of a group of several thousand low-earth-orbit satellites emerging in recent years, the position relation among the satellites changes with time. Moreover, to maintain the formation of formation flight, each individual satellite operates its propulsion device to actively perform orbital attitude control. Thus, it is required to update the planned orbit information on a real-time basis, which is of a high degree of difficulty.

In the optical communication system according to the above-described embodiment, a biaxial rough-precision directivity direction changing device and a biaxial high-precision directivity direction changing device are provided as optical communication terminals. And, in the optical communication system, the orbit information and the position information of satellites or movable bodies as a plurality of communication targets are acquired on a real-time basis with high accuracy. Furthermore, in the optical communication system, a change in relative position is corrected by the biaxial rough-precision directivity direction changing device, and a residual error is corrected by the biaxial high-precision directivity direction changing device. With this, according to the optical communication system of the above-described embodiment, when optical communication is performed with a plurality of communication targets, a breakdown of communication with a change in directivity direction is inhibited and a highly-stable optical crosslink can be continued.

Embodiment 3

In the present embodiment, points to be added to or different from Embodiments 1 and 2 are mainly described. Note that a structure similar to that of Embodiments 1 and 2 is provided with the same reference character and its description may be omitted.

In the present embodiment, variations of the optical communication system described in Embodiment 1 are described.

Figure 16:
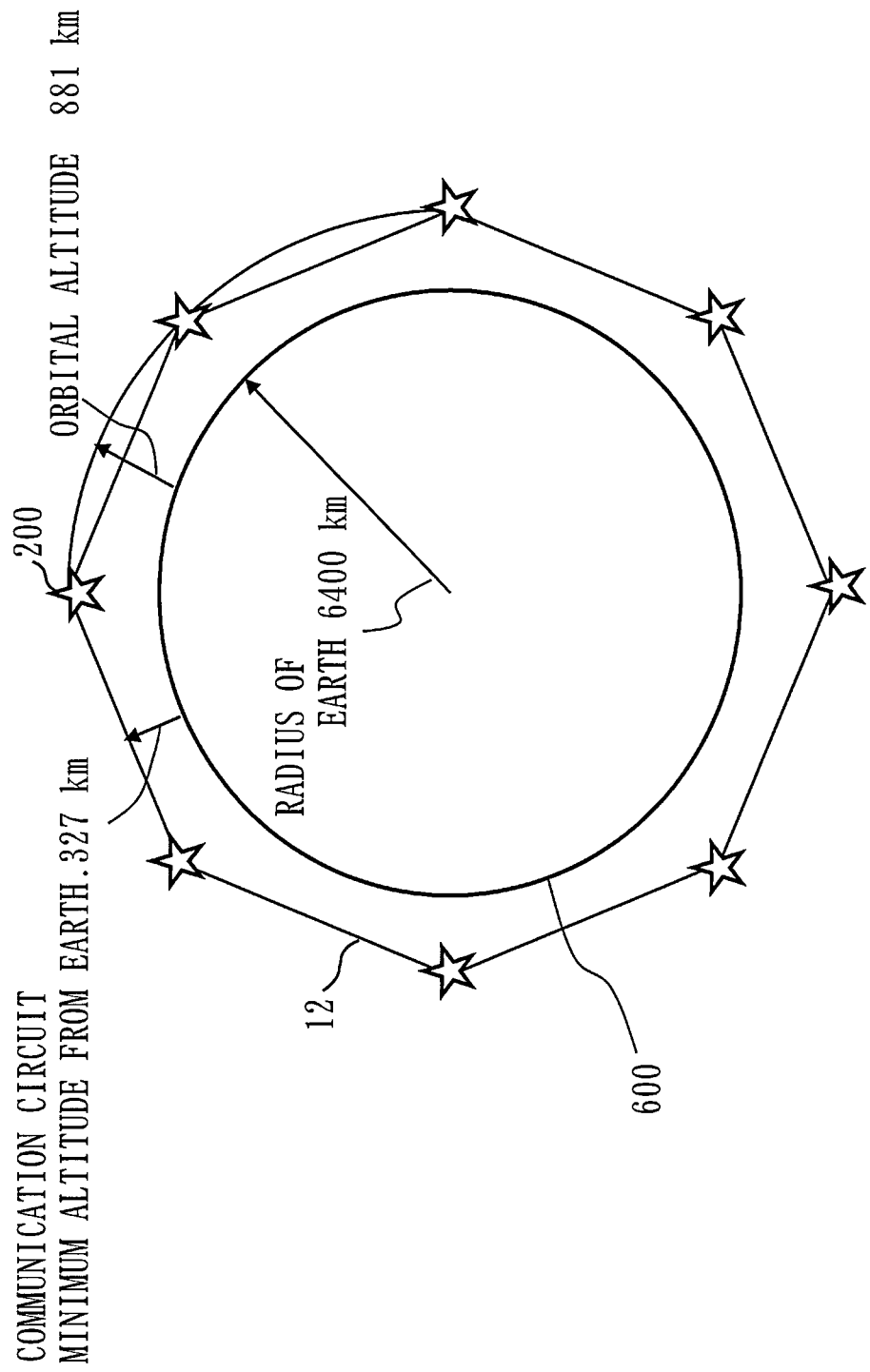
FIG. 16 is a diagram illustrating a state in which eight communication satellites are arranged on an orbital plane according to Embodiment 3.

FIG. 16 illustrates an example of orbital planes of a satellite constellation configuring the optical communication system 500 according to the present embodiment.

Figure 17:
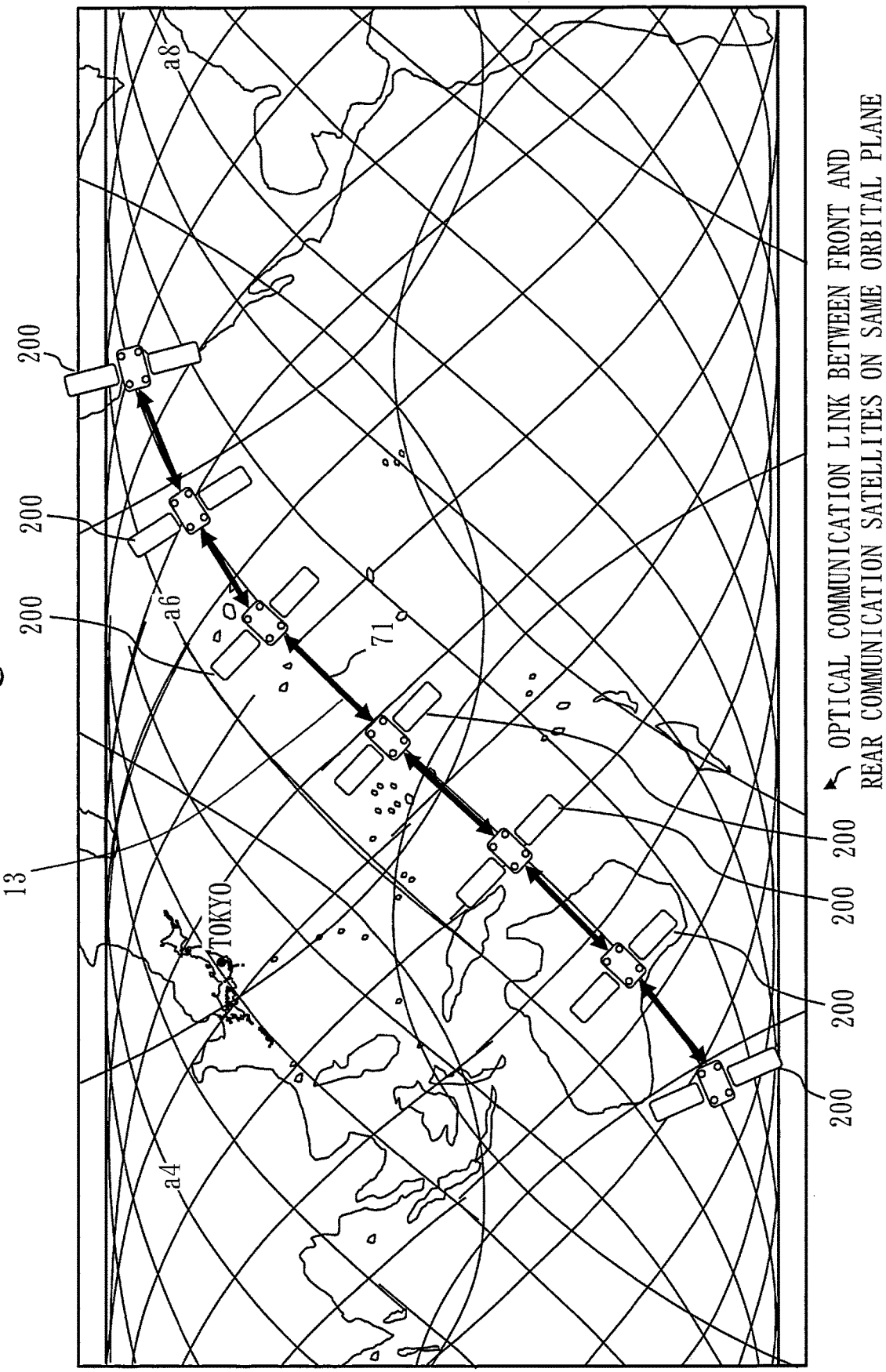
FIG. 17 is a diagram illustrating an optical communication link between front and rear communication satellites on the same orbital plane according to Embodiment 3.

FIG. 17 is a diagram illustrating an example of an optical communication link between front and rear communication satellites on the same orbital plane.

The communication satellites 200 according to the present embodiment each include a communication device which performs inter-satellite communication and a communication device which communicates with a ground facility.

Eight or more communication satellites 200 fly on the same orbital plane in substantially uniform arrangement, and form a satellite constellation in which eight or more orbital planes are substantially uniformly arranged in a longitudinal direction.

In the optical communication system 500 according to the present embodiment, at least one or more communication satellites each include a communication device with a user satellite to relay and transmit satellite information between the user satellite and the ground facility.

In each communication satellite 200, a satellite forwarding direction is taken as a +X direction, and a geocentric direction is taken as a +Z direction. Also, in the communication satellite 200, an axis perpendicular to the forwarding direction is taken as a Y axis.

The communication satellite 200 includes a first optical communication terminal, a second optical communication terminal, a third optical communication terminal, and a fourth optical communication terminal.

Each optical communication terminal performs optical communication as follows when the communication satellite 200 passes northward over the equator.

The first optical communication terminal performs optical communication with a front satellite in a flying direction on the same orbital plane.

The second optical communication terminal performs optical communication with a rear satellite in the flying direction on the same orbital plane.

The third optical communication terminal performs optical communication with a satellite flying northeast (+X+Y) of an east-side (+Y) adjacent orbit.

The fourth optical communication terminal performs optical communication with a satellite flying southwest (−X−Y) of a west-side (−Y) adjacent orbit.

The Azimuth communication visual field of the third optical communication terminal is equal to or more than ±90° with respect to a forwarding direction (+X axis).

Also, the Azimuth communication visual field of the fourth optical communication terminal is equal to or more than ±90° with respect to a direction (−X axis) opposite to the forwarding direction.

FIG. 16 illustrates a state in which eight communication satellites 200 are arranged on an orbital plane in the optical communication system 500 according to the present embodiment. When eight or more communication satellites 200 are uniformly arranged on one orbital plane with an orbital altitude equal to or more than 300 km and one communication satellite 200 communicates with front and rear communication satellites 200, a communication circuit with the communication satellites 200 continuously communication-connected can be formed. If any communication satellite 200 communicates with the ground facility 701, the satellite information of any communication satellite 200 arranged on an orbital plane 12 can be transferred to the ground facility 701. If the number of satellites is small, a communication path and the earth surface tangent become closer in distance, and it is thus required to increase the orbital altitude. If many satellites are arranged, a communication circuit can be formed without receiving atmospheric influences if the orbital altitude is at least 300 km.

FIG. 17 illustrates an optical communication link 71 between front and rear communication satellites among the communication satellites 200 on the same orbital plane of an inclined orbit. With many orbits 13 which are inclined orbits and formed as in FIG. 17 being uniformly arranged in the longitudinal direction to form a communication circuit also with a communication satellite in adjacent orbit, a communication network covering the entire globe can be formed.

Figure 18:
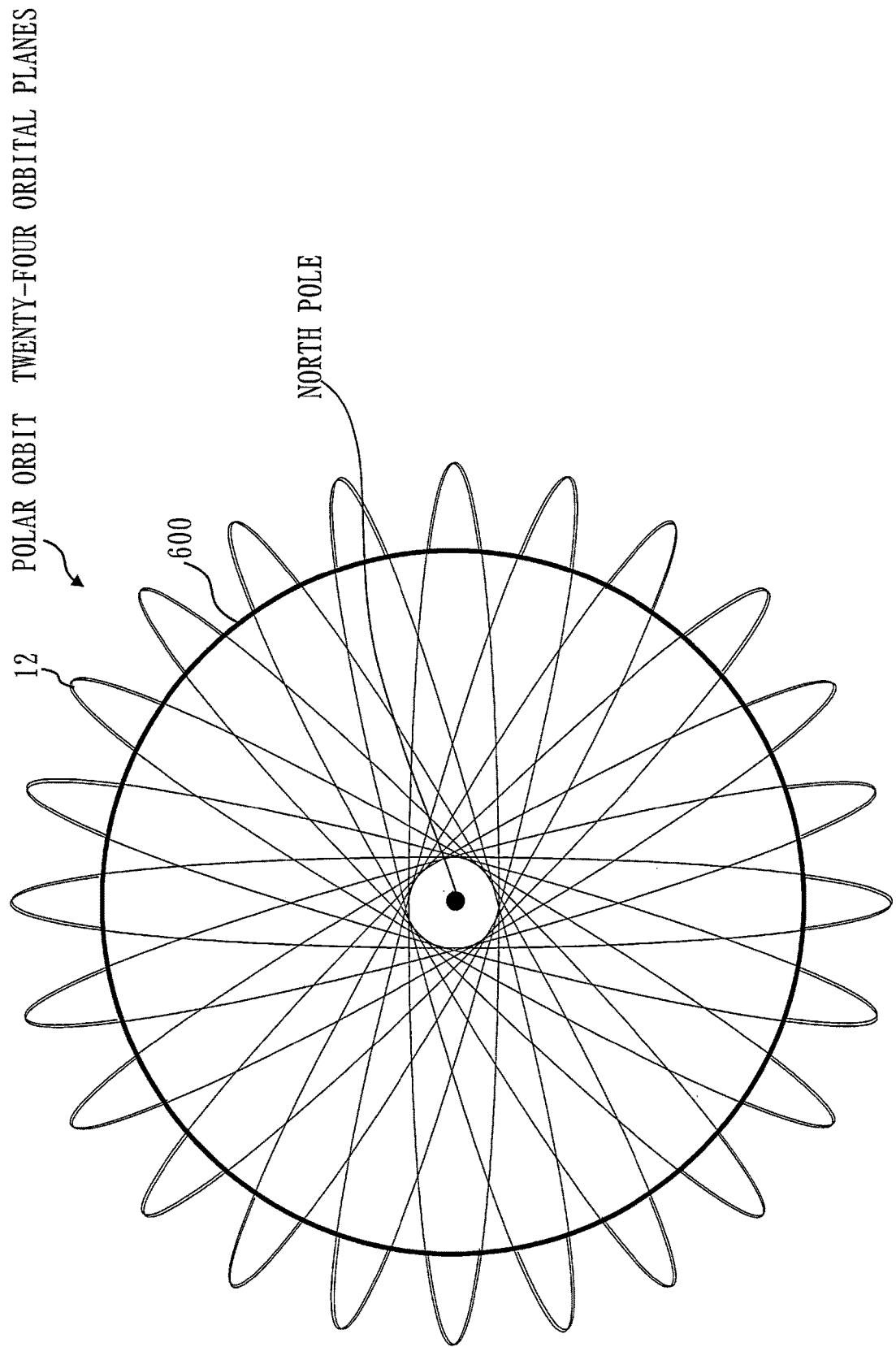
FIG. 18 is a diagram in which a polar orbit having twenty-four orbital planes is viewed from the North Pole side according to Embodiment 3.

FIG. 18 is a diagram in which a polar orbit having twenty-four orbital planes 12 is viewed from the North Pole side.

Figure 19:
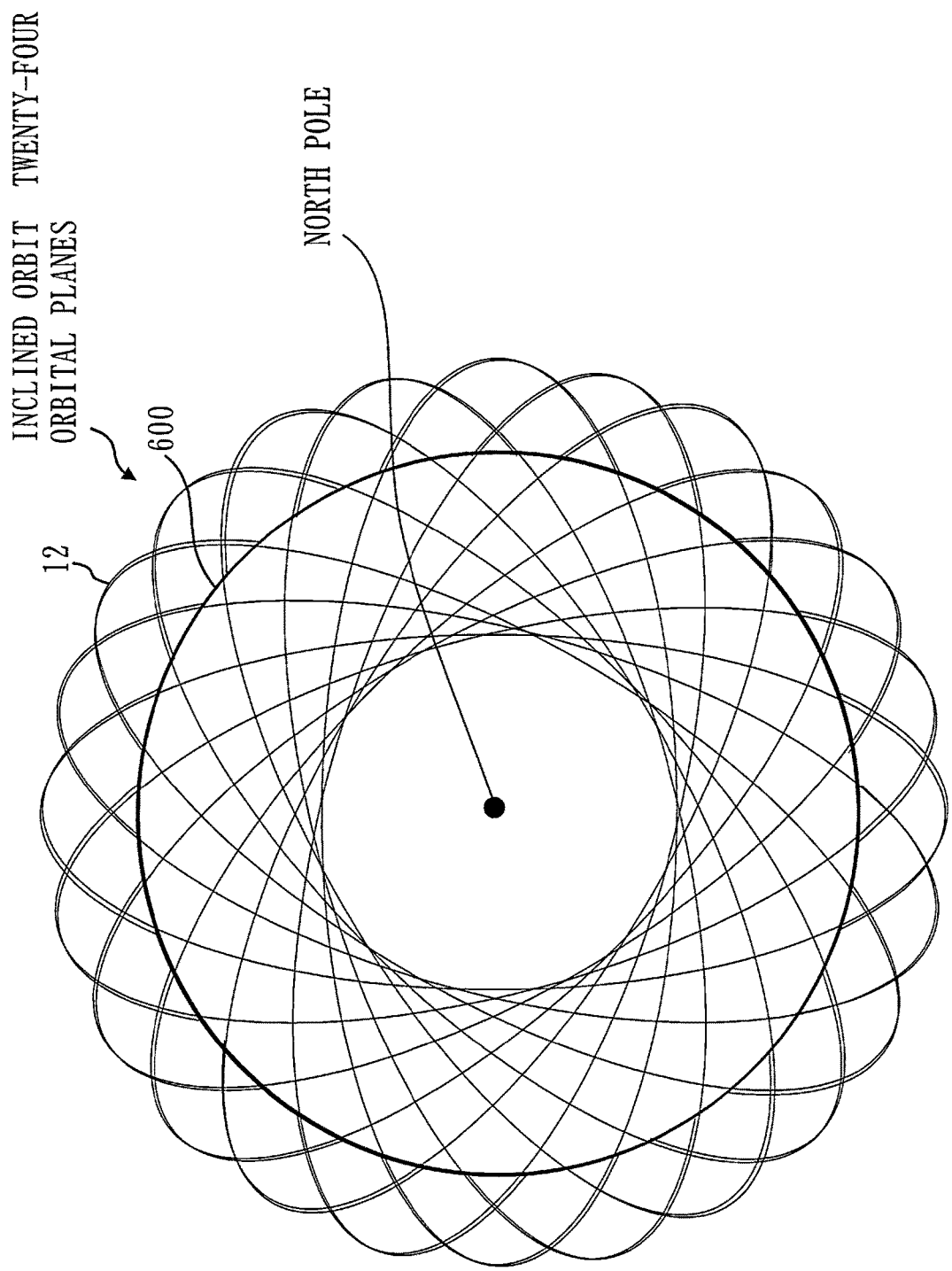
FIG. 19 is a diagram in which an inclined orbit having twenty-four orbital planes is viewed from the North Pole side according to Embodiment 3.

FIG. 19 is a diagram in which an inclined orbit having twenty-four orbital planes 12 is viewed from the North Pole side. In the polar orbit or the inclined orbit, a relative distance from an adjacent orbit is maximum above the equator. With eight or more orbital planes, communication between adjacent orbits can be performed. As the number of orbital planes increases, a communication circuit is established even at a lower orbital altitude. In the case of the polar orbit illustrated in FIG. 18, a heavily-congested areas of communication satellites occurs in a polar region, but no intersection of orbital planes occurs in a mid-latitude zone. On the other hand, as illustrated in FIG. 19, in the case of the inclined orbit, heavy congestion in the polar region is mitigated, but many intersections of orbital planes are present in the mid-latitude zone. Each communication satellite is connected via the optical communication link 71.

Figure 20:
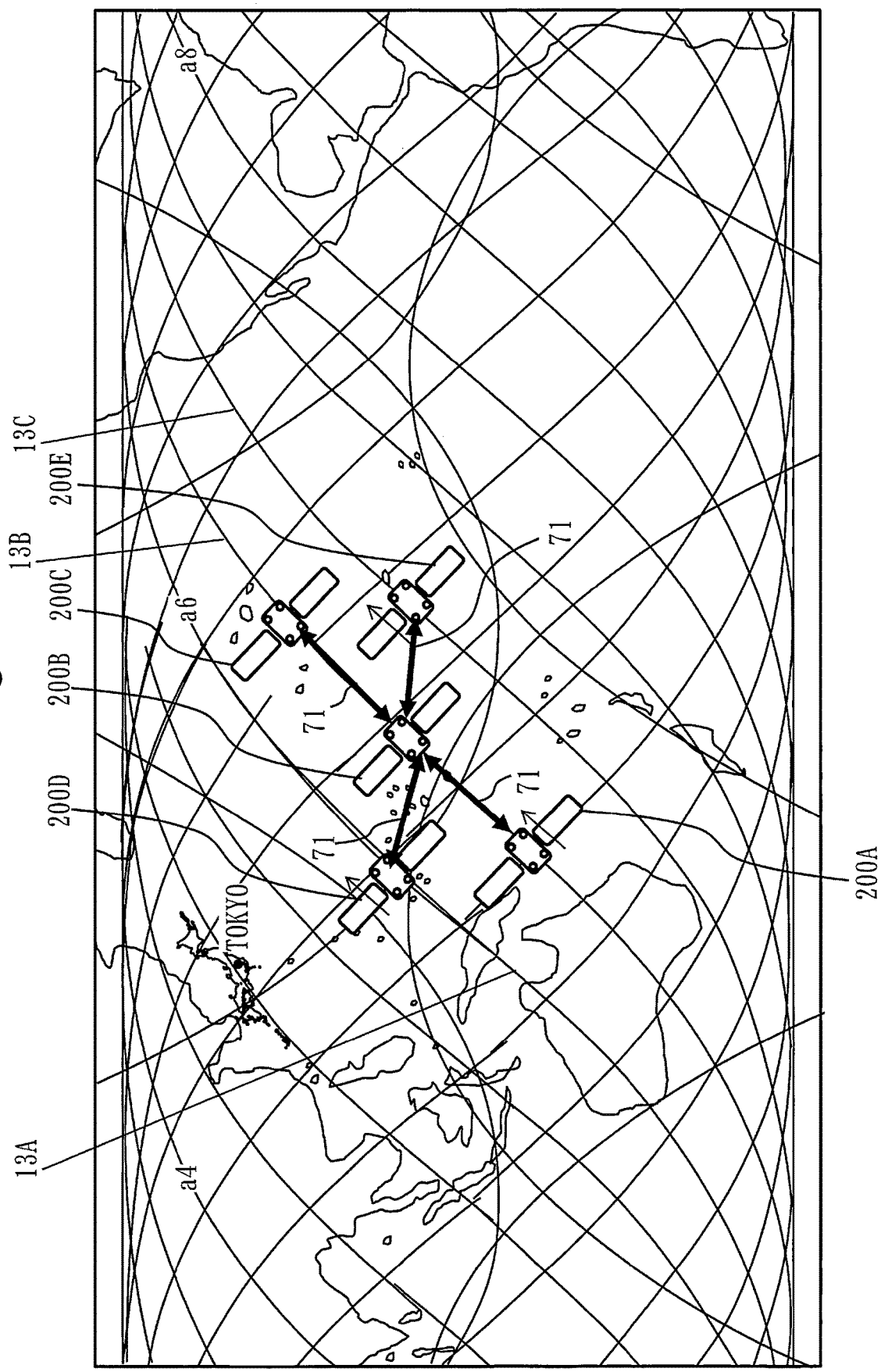
FIG. 20 is a diagram illustrating a situation of optical communication by communication satellites according to Embodiment 3.

FIG. 20 illustrates a situation in which a communication satellite 200B in an orbit 13B performs optical communication with front and rear communication satellites 200A and 200C and performs optical communication with a communication satellite 200D in an adjacent orbit 13A and a communication satellite 200E in an adjacent orbit 13C.

Figure 21:
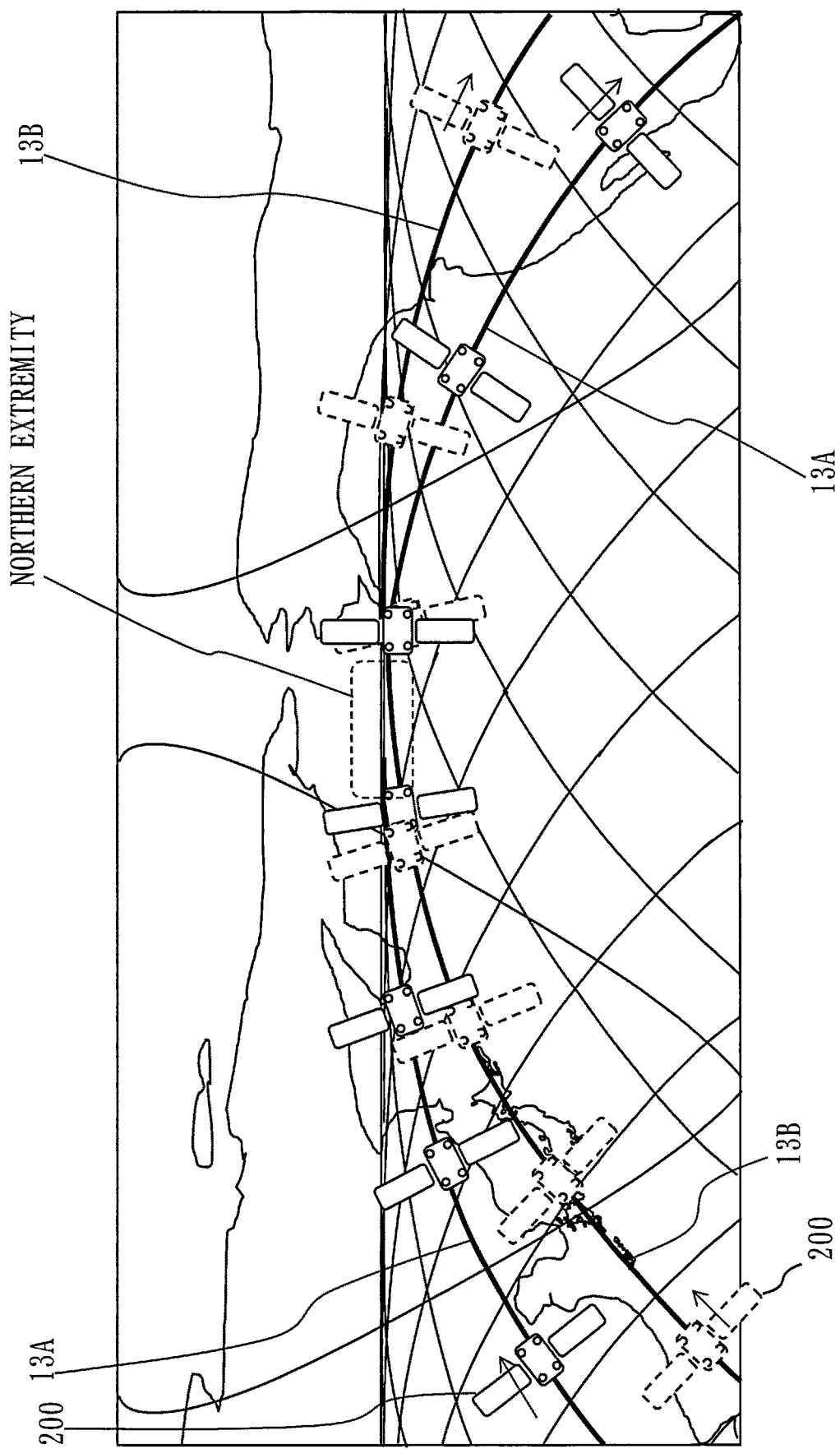
FIG. 21 is a diagram illustrating changes in position of communication satellites flying in inclined orbits according to Embodiment 3.

FIG. 21 illustrates changes in position of the communication satellites 200 flying in the orbit 13A and the orbit 13B of the inclined orbits. The communication satellite 200 flying in the orbit 13B is indicated by broken lines. Before arriving at the northern extremity, the communication satellite 200 in the orbit 13B is positioned on the right with respect to the flying direction of the communication satellite 200 in the orbit 13A. And, after the communication satellite 200 in the orbit 13A and the communication satellite 200 in the orbit 13B pass over the northern extremity, the communication satellite 200 in the orbit 13B is positioned on the left with respect to the flying direction of the communication satellite 200 in the orbit 13A.

As illustrated in FIG. 21, as for a communication circuit with an adjacent orbit in polar orbits and inclined orbits, there is a problem in which since the orbit is laterally changed at the northern extremity or the southern extremity of the orbital plane, it is difficult to maintain the communication circuit without a breakdown.

Also, as illustrated in FIG. 19, there is a risk of collision of satellites at an intersection of orbital planes occurring in the mid-latitude zone in inclined orbits. To avoid the collision risk, collision avoiding measures of changing the orbital altitude for each orbital plane is effective. In this case, there is a problem in which since the ground speed of the communication satellite is varied for each orbital plane, this makes it difficult to maintain the communication circuit with the communication satellite in the adjacent circuit as time elapses.

The optical communication system 500 according to the present embodiment is a system which solves these problems. In the optical communication system 500 according to the present embodiment, the communication satellite 200 flying in an orbit communicates with the communication satellite 200 flying in an adjacent orbit as follows. The communication satellite 200 communicates with a communication satellite in an east-side adjacent orbit in a northeast direction, and communicates with a communication satellite in a west-side adjacent orbit in a southwest direction. Also, the communication satellite 200 ensures a communication visual field at ±90 degrees or more in an Azimuth rotating direction with respect to the satellite forwarding direction +X. This allows the communication satellite 200 to avoid a communication breakdown at the time of laterally changing the adjacent orbital plane.

By changing the orbital altitude for each orbital plane, a satellite collision is avoided. In this case, by dynamically changing the orbital altitude, an average orbital altitude is maintained, thereby avoiding a communication circuit breakdown due to a difference in ground speed for each orbital plane. There is an effect in which, by maintaining the average orbital altitude, communication with an adjacent orbit satellite can be always maintained and a collision between satellites can be avoided.

Figure 22:
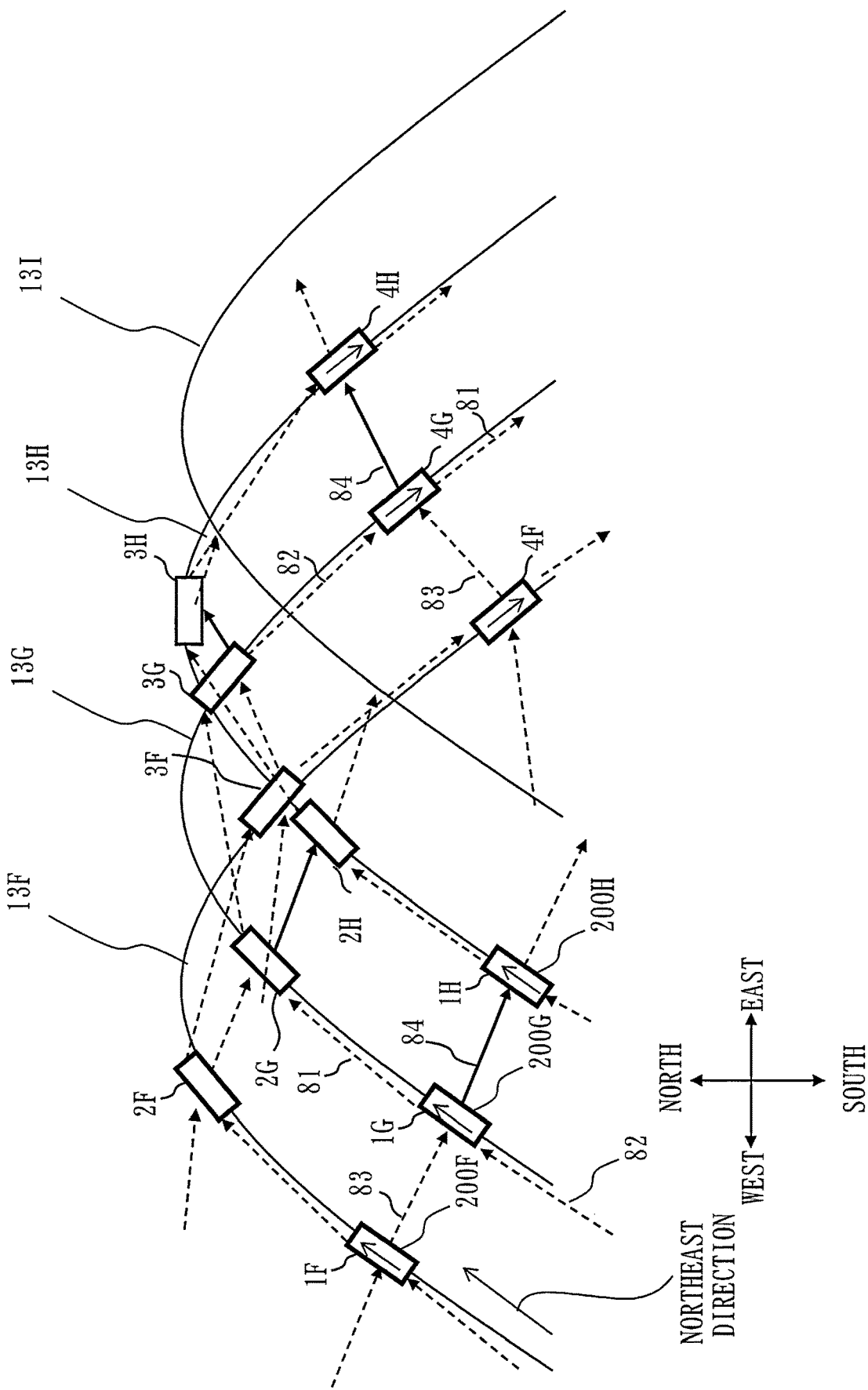
FIG. 22 is a diagram illustrating inversion in a communication direction occurring due to a lateral change of the orbit at the northern extremity of the orbital planes according to Embodiment 3.

FIG. 22 is a diagram illustrating inversion in a communication direction occurring due to a lateral change of the orbit at the northern extremity of the orbital planes. The orbits in FIG. 22 are inclined orbits. The communication satellites 200 flying in an orbit 13F, an orbit 13G, and an orbit 13H are distinguished as a communication satellite 200F, a communication satellite 200G, and a communication satellite 200H. In the orbit 13F, the positions of the communication satellite 200F with elapse of time are indicated as a position 1F, a position 2F, a position 3F, and a position 4F. The same goes for the orbit 13G and the orbit 13H. As for the communication satellite 200G at a position 1G, the communication satellite 200G is connected via an optical communication link 81 to the front communication satellite 200 not depicted in the flying direction and is connected via an optical communication link 82 to the rear communication satellite 200 not depicted in the flying direction. Also, the communication satellite 200G is connected via an optical communication link 83 to the communication satellite 200F at the position 1F adjacently flying in the orbit 13F and is connected via an optical communication link 84 to the communication satellite 200H at a position 1H adjacently flying in the orbit 13H. As for the communication satellite 200G, the connection with the communication satellite 200F is the optical communication link 83, and the connection with the communication satellite 200H is the optical communication link 84. In FIG. 22, the optical communication link 84 is indicated by a solid line.

As time elapses, the positions of the communication satellite 200F, the communication satellite 200G, and the communication satellite 200H become a position 4F, a position 4G, and a position 4H, respectively. Here, as for the optical communication link 84 indicated by the solid line, the optical communication link 84 at the position 1G is on the right with respect to the flying direction of the communication satellite 200G. By contrast, at the position 4G after passage over the northern extremity of the orbit, the optical communication link 84 is on the left with respect to the flying direction of the communication satellite 200G.

Figure 23:
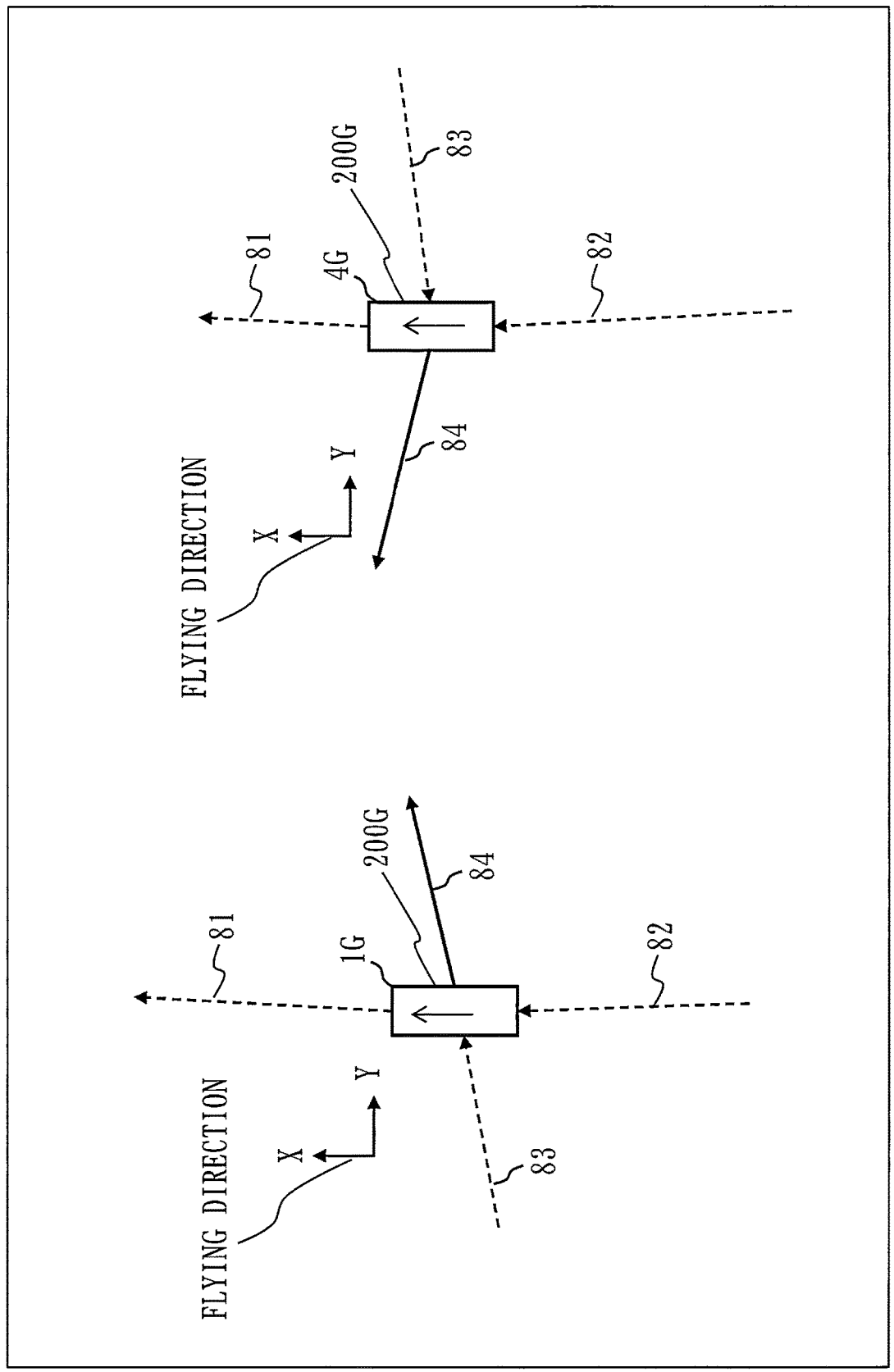
FIG. 23 is a diagram of a communication satellite extracted from FIG. 22 according to Embodiment 3.

In FIG. 23, the communication satellites 200G at the position 1G and the position 4G are extracted from FIG. 22 and arranged to be illustrated in satellite coordinate system. Since a lateral change occurs between the directions of the optical communication link 83 and the optical communication link 84, they are twisted in the communication satellites 200G. That is, in a communication with an adjacent orbit, if trying to perform communication with the communication satellite 200 flying adjacently to the forwarding direction of the communication satellite 200G, the communication satellite 200G has a difficulty at the position 4G in communication with the communication satellite 200F and the communication satellite 200H flying on adjacent orbits.

Figure 24:
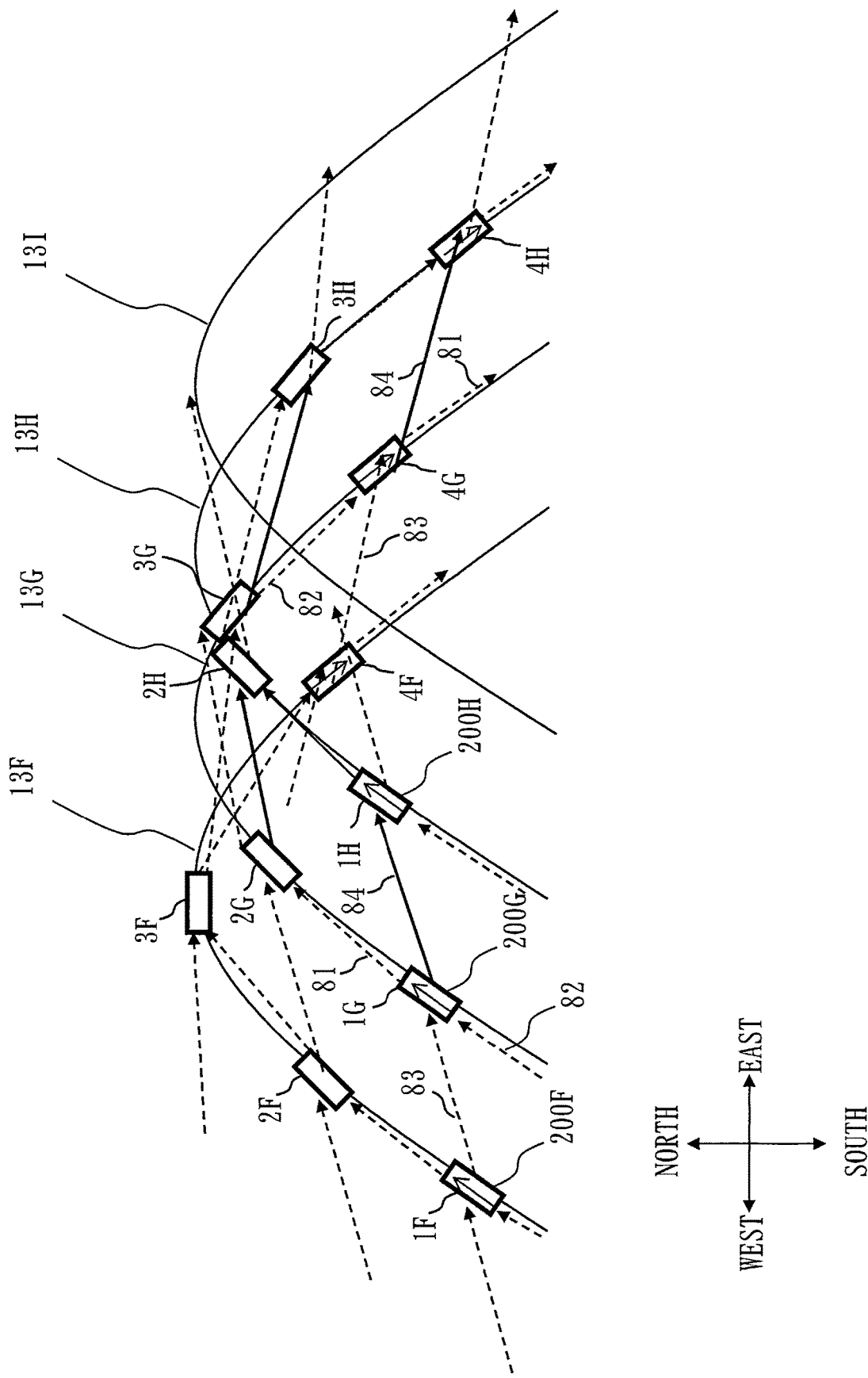
FIG. 24 is a diagram illustrating a scheme of eliminating communication difficulty in FIG. 22 according to Embodiment 3.

FIG. 24 is a diagram illustrating a scheme of eliminating communication difficulty at the position 4G in FIG. 22. The scheme in FIG. 24 is different from the scheme in FIG. 22 as follows. In FIG. 22, an optical link is formed with the communication satellite 200 adjacently flying in an adjacent orbit. In FIG. 24, when passing northward over the equator, the communication satellite 200 performs optical communication with another communication satellite 200 flying northeast of an east-side adjacent orbit and performs optical communication with another communication satellite 200 flying southwest of a west-side adjacent orbit. The communication satellite 200G of FIG. 24 is now described.

The communication satellite 200G is connected via the optical communication link 81 to the front communication satellite 200 not depicted in the flying direction and is connected via the optical communication link 82 to the rear communication satellite 200 not depicted in the flying direction. Also, the communication satellite 200G is connected via the optical communication link 83 to the communication satellite 200F at the position 1F flying at a southwest position in the orbit 13F and is connected via the optical communication link 84 to the communication satellite 200H at the position 1H flying at a northeast position in the orbit 13H. In FIG. 24, the optical communication link 84 is indicated by a solid line.

As time elapses, the positions of the communication satellite 200F, the communication satellite 200G, and the communication satellite 200H become the position 4F, the position 4G, and the position 4H, respectively. Here, as for the optical communication link 84 indicated by the solid line, the optical communication link 84 at the position 1G is on the right with respect to the flying direction of the communication satellite 200G. By contrast, at the position 4G after passage over the northern extremity of the orbit, the optical communication link 84 is on the left with respect to the flying direction of the communication satellite 200G. This is the same as FIG. 22.

Figure 25:
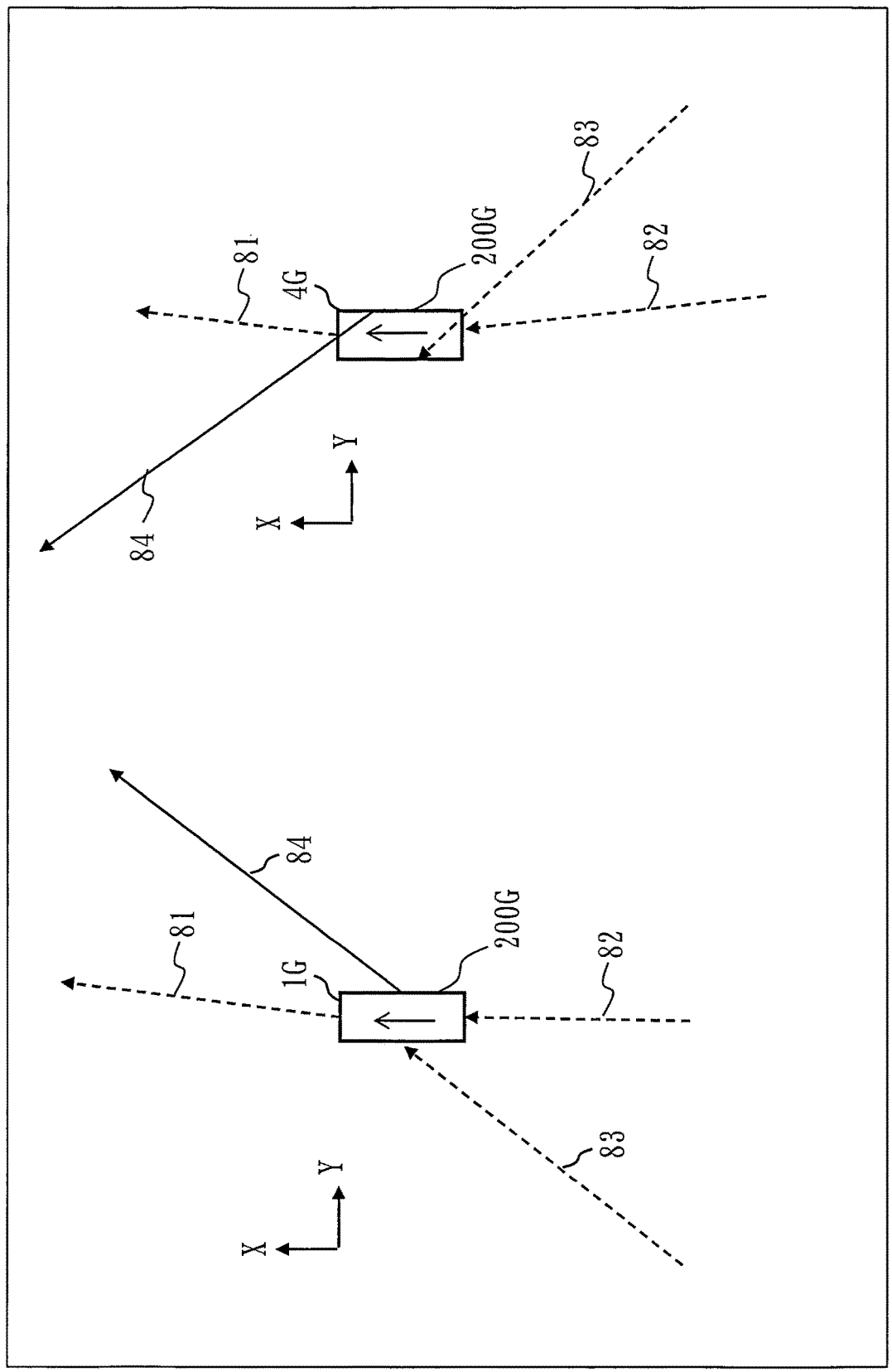
FIG. 25 is a diagram of a communication satellite extracted from FIG. 24 according to Embodiment 3.

In FIG. 25, the communication satellites 200G at the position 1G and the position 4G are extracted from FIG. 24 and arranged to be illustrated in satellite coordinate system. Since a lateral change occurs between the directions of the optical communication link 83 and the optical communication link 84, they are twisted in the communication satellites 200G. However, in FIG. 25, the amount of twists of the optical communication link 83 and the optical communication link 84 is small compared with in FIG. 23. In FIG. 25, the amounts of change in direction of the optical communication link 83 and the optical communication link 84 are both within 90 degrees.

As described above, in the present embodiment, the following effects are exerted.

As for communication with adjacent orbit satellites, communication is performed with an east-side adjacent orbit satellite in the southeast direction and with a west-side adjacent orbit satellite in the northwest direction, and a communication visual field equal to or more than ±90 degrees in the Azimuth rotating direction is ensured with respect to the satellite forwarding direction, thereby avoiding a communication breakdown at the time of lateral change of adjacent orbital planes.

By changing the orbital altitude for each orbital plane, a satellite collision is avoided. By dynamically changing the orbital altitude, an average orbital altitude is maintained, thereby avoiding a communication circuit breakdown due to a difference in ground speed for each orbital plane.

The present embodiment has an effect in which communication with adjacent orbit satellites can be always maintained and a collision between satellites can be avoided.

Embodiment 4

In the present embodiment, points to be added to or different from Embodiments 1 to 3 are mainly described. Note that a structure similar to that of Embodiments 1 to 3 is provided with the same reference character and its description may be omitted.

In the present embodiment, an example of structure of the communication satellite 200 in the optical communication system 500 described in Embodiment 3 is described.

Figure 26:
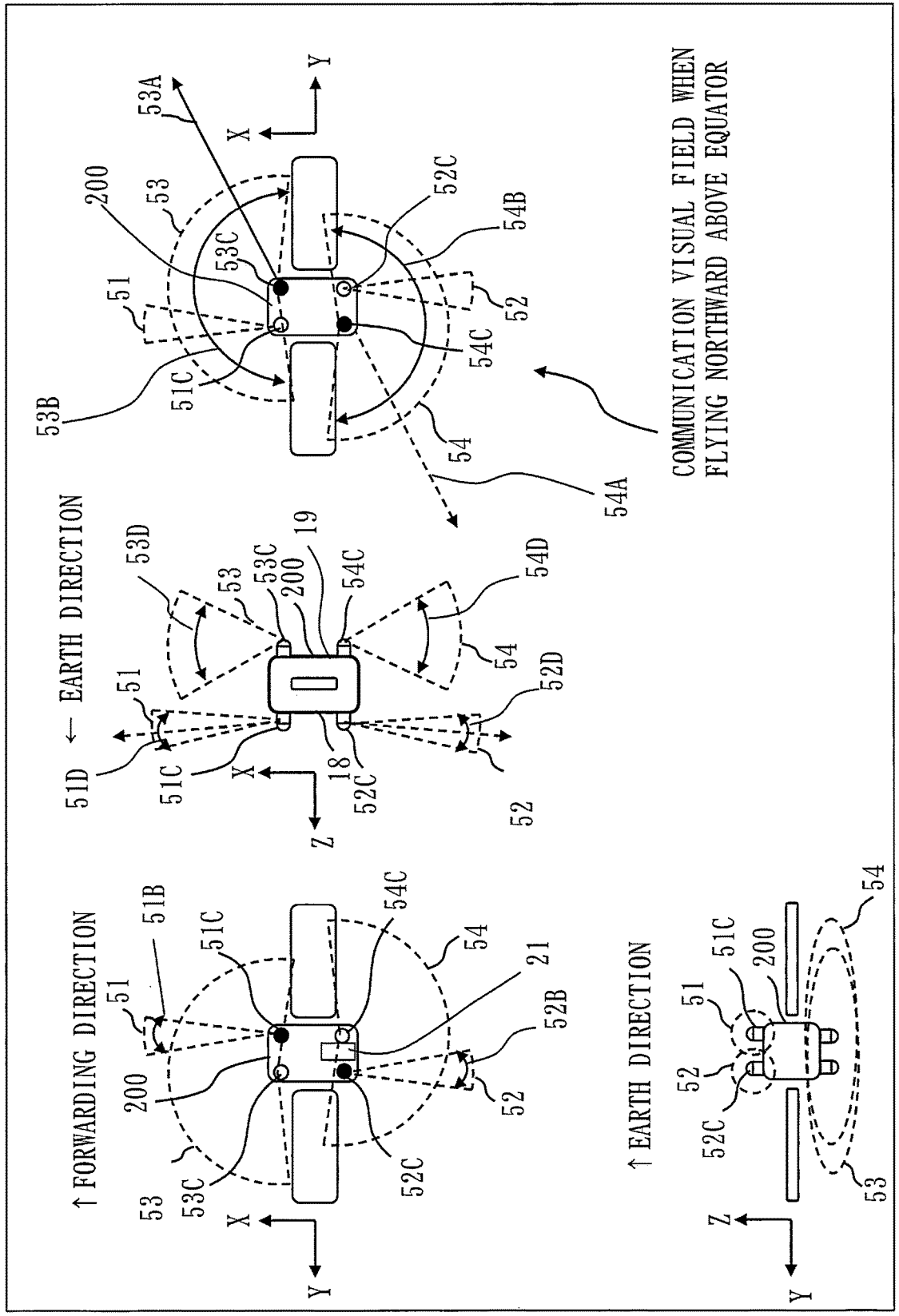
FIG. 26 is a diagram illustrating the arrangement of communication terminals in a communication satellite according to Embodiment 4.

FIG. 26 is a diagram illustrating the arrangement of communication terminals in the communication satellite 200 according to Embodiment 4.

Figure 27:
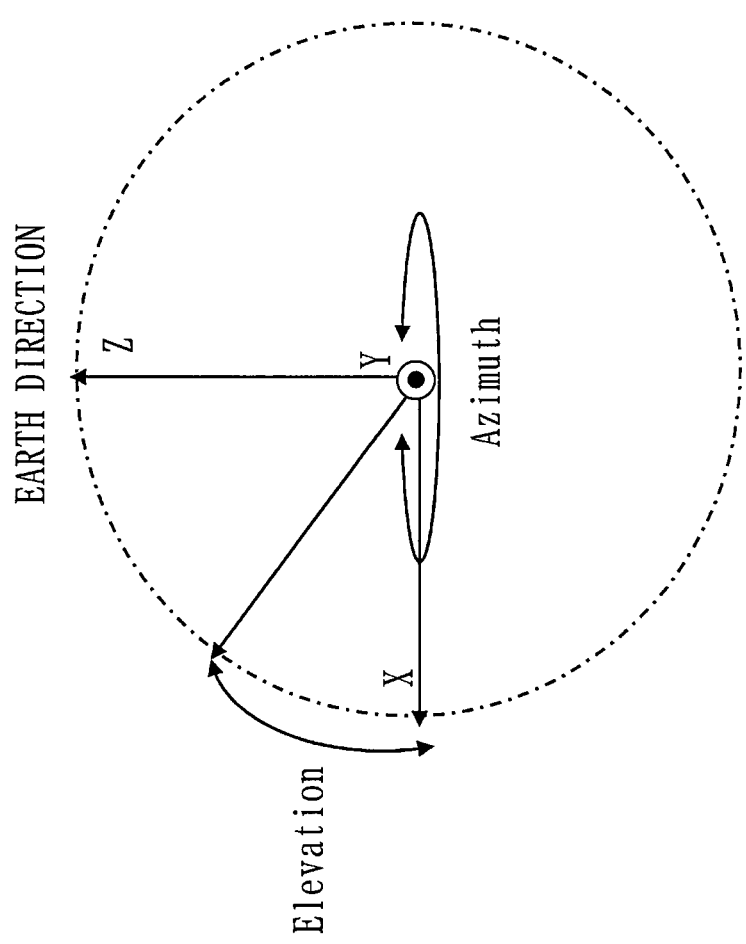
FIG. 27 is a diagram illustrating an Azimuth rotating direction and an Elevation rotating direction.

FIG. 27 is a diagram illustrating an Azimuth rotating direction and an Elevation rotating direction.

An earth-oriented direction of the communication satellite 200 is taken as a Z axis, and a forwarding direction is taken as an X axis.

The optical communication terminals can each change its directivity direction to two axes, Azimuth rotation about the Z axis and Elevation rotation perpendicular to the Z axis.

A first optical communication terminal 51C and a second optical communication terminal 52C are arranged on an earth-oriented plane (+Z plane).

A third optical communication terminal 53C and a fourth optical communication terminal 54C are arranged on a counter-earth-oriented plane (−Z plane).

The driving center of the first optical communication terminal 51C and the driving center of the third optical communication terminal 53C are not on the same axis of a forwarding direction vector. The driving center of the second optical communication terminal 52C and the driving center of the fourth optical communication terminal 54C are not on the same axis of the forwarding direction vector.

FIG. 26 illustrates a specific arrangement of the communication terminals of the communication satellite 200 described in FIG. 24. FIG. 26 illustrates a state in which the communication satellite 200 flies northward above the equator. FIG. 26 illustrates four orthogonal views of the communication satellite 200.

FIG. 27 illustrates an Azimuth rotating direction and an Elevation rotating direction. The Azimuth rotating direction is about the +Z axis in the right-handed coordinates, and the Elevation rotating direction is about the +Y axis in the right-handed coordinates. The communication satellite 200 is arranged on a plurality of orbital planes in a polar orbit or inclined orbit. The communication satellite 200 includes the first optical communication terminal 51C, the second optical communication terminal 52C, the third optical communication terminal 53C, and the fourth optical communication terminal 54C. The first optical communication terminal 51C performs optical communication with another front communication satellite 200 in the flying direction on the same orbital plane when passing northward above the equator in the case where the +X axis direction oriented to a plus direction in the right-handed coordinates is taken as a satellite forwarding direction +X of the communication satellite 200 and the +Z axis direction oriented to a plus direction in the right-handed coordinates is taken as a geocentric direction +Z of the communication satellite 200. The second optical communication terminal 52C performs optical communication with another rear communication satellite 200 in the flying direction on the same orbital plane when passing northward above the equator. The third optical communication terminal 53C performs optical communication with another communication satellite 200 flying northeast of an east-side adjacent orbit. The fourth optical communication terminal 54C performs optical communication with another communication satellite 200 flying southwest of a west-side adjacent orbit.

In FIG. 26, a black circle on an XY plane indicates that its optical communication terminal can be actually viewed, and a white circle indicates that the optical communication terminal cannot be actually viewed. The first optical communication terminal 51C is arranged forward in the forwarding direction of the communication satellite 200. The first optical communication terminal 51C has a communication visual field 51 in the forwarding direction of the communication satellite 200. The second optical communication terminal 52C is arranged rearward of the first optical communication terminal 51C with respect to the forwarding direction of the communication satellite 200. The second optical communication terminal 52C has a communication visual field 52 in a direction opposite to the forwarding direction of the communication satellite 200. The third optical communication terminal 53C is arranged forward in the forwarding direction of the communication satellite 200. The third optical communication terminal 53C has a communication visual field 53 forward in the forwarding direction of the communication satellite 200. The third optical communication terminal 53C forms an optical communication link with the communication satellite 200 flying in the orbit 13 adjacent on an east side in a northeast communicating direction 53A. The fourth optical communication terminal 54C is arranged rearward of the third optical communication terminal 53C with respect to the forwarding direction of the communication satellite 200. The fourth optical communication terminal 54C has a communication visual field 54 in a direction opposite to the forwarding direction of the communication satellite 200. The fourth optical communication terminal 54C forms an optical communication link with the communication satellite 200 flying in the orbit 13 adjacent on a west side in a southwest communicating direction 54A.

<Azimuth>

The Azimuth communication visual field of the third optical communication terminal 53C is equal to or more than ±90 degrees with respect to the satellite forwarding direction +X. That is, as illustrated in an XY plane on the right side of FIG. 26, an Azimuth visual field change range 53B of the third optical communication terminal 53C is equal to or more than ±90 degrees with respect to the satellite forwarding direction +X. Also, the Azimuth communication visual field of the fourth optical communication terminal 54C is equal to or more than ±90 degrees with respect to an opposite direction of the satellite forwarding direction +X. That is, an Azimuth visual field change range 54B of the fourth optical communication terminal 54C is equal to or more than ±90 degrees with respect to the satellite forwarding direction +X.

<Azimuth and Elevation>

The description on FIG. 26 further continues. The first optical communication terminal 51C, the second optical communication terminal 52C, the third optical communication terminal 53C, and the fourth optical communication terminal 54C can make Azimuth rotation about the +Z axis. Since Azimuth visual field changes of the third optical communication terminal 53C and the fourth optical communication terminal 54C have been described, Azimuth visual field changes of the first optical communication terminal 51C and the second optical communication terminal 52C are described. As illustrated in an XY plane on the left side of FIG. 26, the first optical communication terminal 51C can change the communication visual field 51 in an Azimuth visual field change range 51B. Also, the second optical communication terminal 52C can change the communication visual field 52 in an Azimuth visual field change range 52B.

The first optical communication terminal 51C, the second optical communication terminal 52C, the third optical communication terminal 53C, and the fourth optical communication terminal 54C can make Elevation rotation about the +Y axis oriented to the plus direction in the right-handed orthogonal coordinates. As illustrated in an XZ plane of FIG. 26, the first optical communication terminal 51C can make Elevation rotation about the +Y axis in an Elevation visual field change range 51D. The second optical communication terminal 52C can make Elevation rotation about the +Y axis in an Elevation visual field change range 52D. The third optical communication terminal 53C can make Elevation rotation about the +Y axis in an Elevation visual field change range 53D. The fourth optical communication terminal 54C can make Elevation rotation about the +Y axis in an Elevation visual field change range 54D.

As illustrated in the XZ plane of FIG. 26, the first optical communication terminal 51C and the second optical communication terminal 52C are arranged on an earth-oriented plane 18 facing the earth 600. The third optical communication terminal 53C and the fourth optical communication terminal 54C are arranged on a counter-earth-oriented plane 19, which is a back plane of the earth-oriented plane 18 and is oriented to an opposite direction of the geocentric direction +Z. A driving part for Azimuth and Elevation rotations of the first optical communication terminal 51C and a driving part for Azimuth and Elevation rotations of the third optical communication terminal 53C are not on a forwarding direction vector oriented to the satellite forwarding direction +X. Also, a driving part for Azimuth and Elevation rotations of the second optical communication terminal 52C and a driving part for Azimuth and Elevation rotations of the fourth optical communication terminal 54C are not on the forwarding direction vector.

To ensure a high visual field angle equal to or more than ±90 degrees in optical communication, arrangement of communication devices without interference in visual field in the communication satellite 200 is imperative.

There is an effect in which, by arranging the first optical communication terminal 51C and the second optical communication terminal 52C, and the third optical communication terminal 53C and the fourth optical communication terminal 54C separately, with ones on the earth-oriented plane 18 and the others on the counter-earth-oriented plane 19, a wide communication visual field range can be ensured.

Furthermore, in the first optical communication terminal 51C and the second optical communication terminal 52C, the visual field direction is inclined to the earth direction with respect to the forwarding direction due to a spherical effect of the earth. It is rational to avoid visual field interruption by arrangement on the earth-oriented plane 18. Also, there is an idea in which the first optical communication terminal 51C and the second optical communication terminal 52C are arranged with one on the earth-oriented plane 18 and the other on the counter-earth-oriented plane 19. This poses a problem of a restriction in implementation when the counter-earth-oriented plane 19 serves as a rocket interface at the time of launching a satellite. Furthermore, since a dead zone occurs on the X axis in an optical communication terminal of a biaxial configuration, Elevation on Azimuth, there is a problem in which standardization of communication terminals are difficult. Still further, the first optical communication terminal 51C and the third optical communication terminal 53C have a possibility in which their visual field directions become identical, and the second optical communication terminal 52C and the fourth optical communication terminal 54C have a possibility in which their visual field directions become identical. Therefore, there is a problem of signal interference. However, there is an effect in which such interference can be avoided by arranging the optical communication terminals on the satellite as separated in distance so that the driving part as a driving center of the first optical communication terminal 51C and a driving part as a driving center of the third optical communication terminal 53C are not on the same axis of the forwarding direction vector and the driving part as a driving center of the second optical communication terminal 52C and a driving part as a driving center of the fourth optical communication terminal are not on the same axis of the forwarding direction vector.

According to the communication satellite 200 disclosed in the present embodiment, there is an effect in which, since standard terminals can be used, cost of system construction can be reduced.

Embodiment 5

In the present embodiment, points to be added to or different from Embodiments 1 to 4 are mainly described. Note that a structure similar to that of Embodiments 1 to 4 is provided with the same reference character and its description may be omitted.

In the present embodiment, a flying object addressing system 800 to which the optical communication system 500 described in Embodiments 1 and 2 is applied is described.

Figure 28:
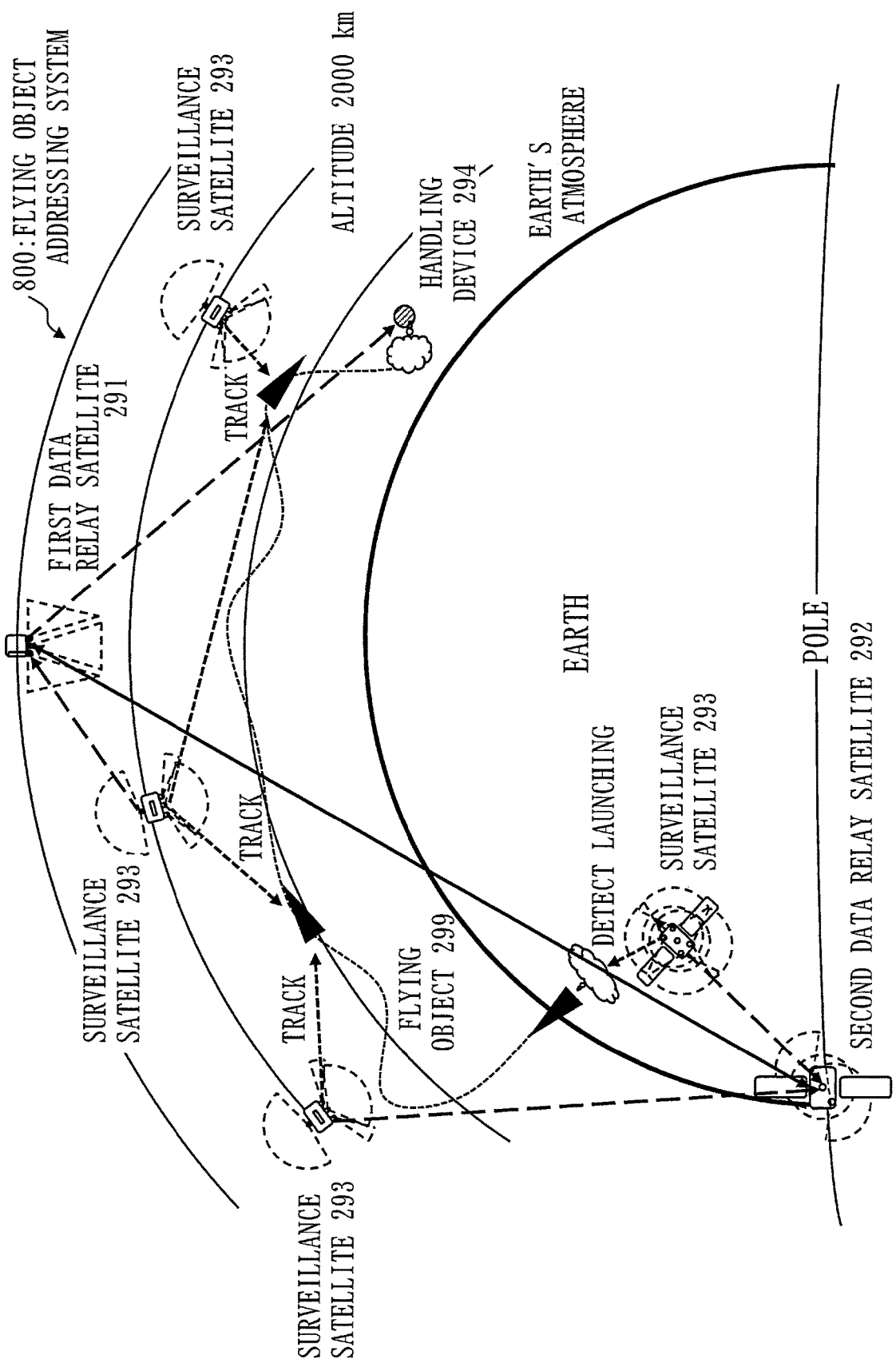
FIG. 28 illustrates an example of structure of a flying object addressing system according to Embodiment 5.

FIG. 28 is a diagram illustrating an example of structure of the flying object addressing system 800 according to the present embodiment.

The flying object addressing system 800 according to the present embodiment is configured of a first data relay satellite 291, a second data relay satellite 292, a plurality of surveillance satellites 293, and a plurality of handling devices 294.

The first data relay satellite 291 flies with an orbital altitude equal to or more than 2000 km above the equator.

The second data relay satellite 292 flies with an orbital altitude equal to or more than 2000 km in a polar orbit.

Each of the plurality of surveillance satellites 293 flies with an orbital altitude equal to or less than 2000 km.

The plurality of handling devices 294 include a handling device which moves in airspace in the earth's atmosphere, on the ground, or by sea, and a handling device fixed to the ground.

A surveillance satellite group as the plurality of surveillance satellites 293 acquires surveillance data of a flying object 299 launched from the ground to fly and transmits the surveillance data to the handling devices 294 via the data relay satellites.

The handling device 294 performs handling action on the flying object 299.

In the flying object addressing system 800, communications among the first data relay satellite 291 configured of a plurality of devices, the second data relay satellite 292 configured of a plurality of devices, the plurality of surveillance satellites 293, the plurality of handling devices 294, and the plurality of ground facilities 701 adopts the optical communication scheme of the optical communication system 500 described in Embodiments 1 and 2.

Since a flying object called HGV (Hyper Glided Vehicle) is boosted in the course of flying, it is impossible to address this with ballistic flying prediction. For the HGV, since an increase in temperature of the main body of the flying object in the course of flying is detected and tracked, information transmission on a real-time basis and surveillance by a low-earth-orbit satellite group are required.

Here, a mechanism has been awaited in which communication between the surveillance satellite and the data relay satellite and between the data relay satellite and the handling device are performed via optical communication. Also, it is required to construct a mechanism of managing real-time orbit information or position information of these satellites and the movable bodies.

To always conduct surveillance on the entire globe, the surveillance satellites 293 are exhaustively arranged over the entire globe. After launching of the flying object 299 is detected, to transmit information about any surveillance satellite 293 to the handling device 294 on a real-time basis, a data relay satellite group, which can always perform data relay of surveillance data and can transmit the surveillance data to the handling devices 294 on land, at sea, in the air, is required. This task is carried out by the data relay satellite group disposed in the plurality of orbits above the equator and in the plurality of polar orbits.

Figure 29:
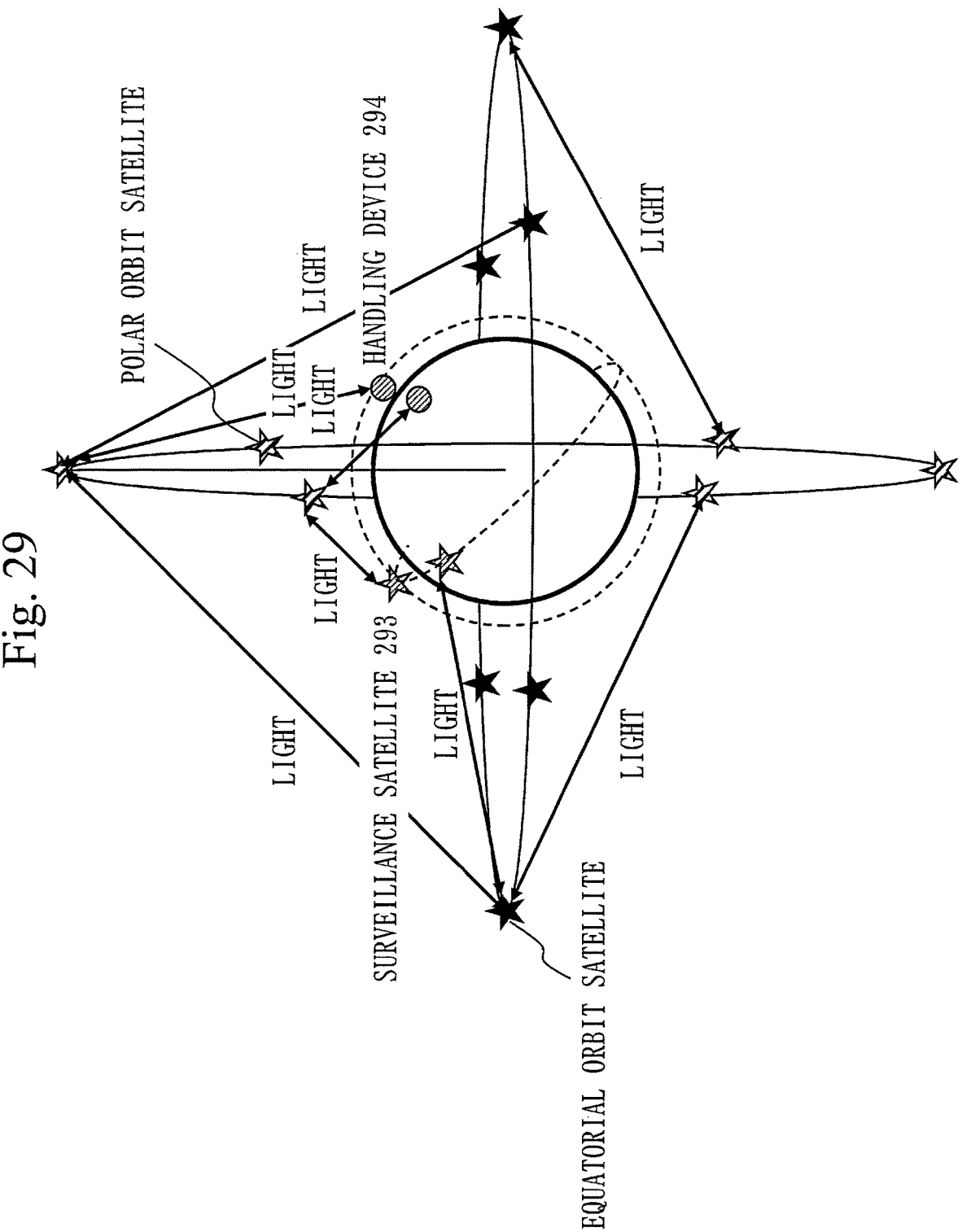
FIG. 29 illustrates an example of optical communication of the flying object addressing system according to Embodiment 5.

FIG. 29 is a diagram illustrating an example of optical communication of the flying object addressing system 800 according to the present embodiment.

Here, since relative positions are changed with time in optical communication between an equatorial orbit satellite group and a polar orbit satellite group, it is rational for satellites to mutually exchange orbit information.

Figure 30:
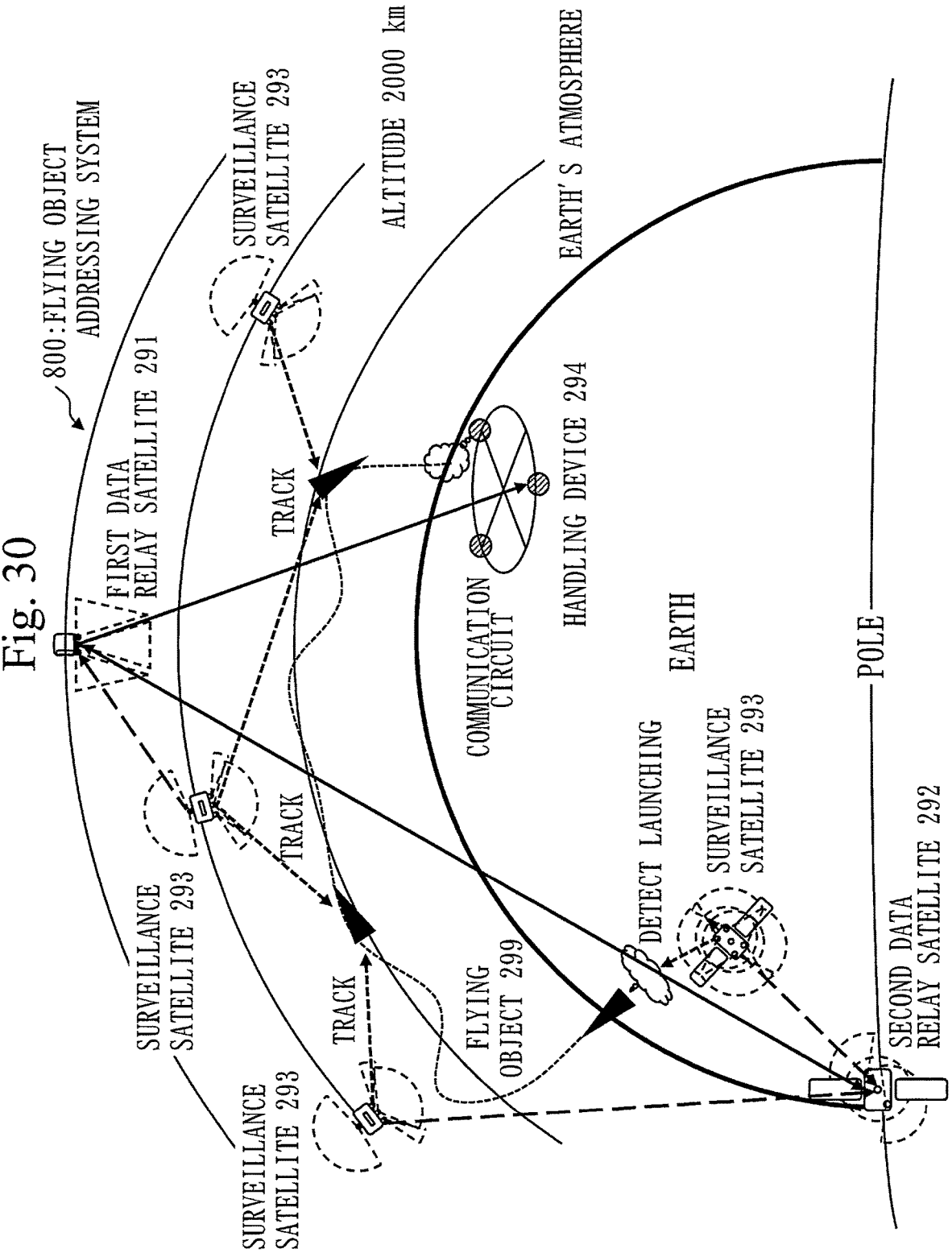
FIG. 30 illustrates another example of structure of the flying object addressing system according to Embodiment 5.

FIG. 30 is a diagram illustrating another example of structure of the flying object addressing system 800 according to the present embodiment.

Also, as for position information of the handling device 294, it is rational to transmit real-time position information of the handling device group from a ground facility which performs centralized control of operation of the handling devices 294 for the purpose of national security, separately from a ground facility which manages operation of the data relay satellites, via a ground facility for the data relay satellites or directly to the data relay satellites to share information via a data relay optical communication network.

According to the flying object addressing system 800 of the present embodiment, there is an effect in which a launch of a flying object which can become a threat in national security can be detected and tracked and highly-accurate real-time information can be transmitted to the handling devices, thereby allowing a crisis to be avoided.

According to the above embodiments, an optical communication system capable of inhibiting a breakdown of communication with a change in directivity direction and continuing a highly-stable optical crosslink can be provided. Also, by adopting an appropriate orbit information sharing method in accordance with the situation, an optical communication system without communication breakdown can be provided.

From the above Embodiments 1 to 5, each unit of each device of the optical communication system, the ground facility, the communication satellite, the surveillance satellite, the data relay satellite, and the flying object addressing system is described as an independent functional block. However, the structure of each system and each device may not be the one as described in the above embodiments. The functional block of each system and each device may have any structure which achieves the functions described in the above embodiments. Also, each system and each device may be a single device or a system configured of a plurality of devices.

Also, among Embodiments 1 to 5, a plurality of portions or examples may be combined for implementation. Alternatively, of these embodiments, one part or example may be implemented. In addition, these embodiments may be entirely or partially combined in any manner.

That is, in Embodiments 1 to 5, a free combination of the respective embodiments, modification of any component in each embodiment, or omission of any component in each embodiment can be made.

Note that the above-described embodiments are intrinsically preferable examples, and are not intended to limit the scope of the present disclosure, the range of application of the present disclosure, and the scope of use purposes of the present disclosure. The above-described embodiments can be variously changed as required.

REFERENCE SIGNS LIST

21: optical antenna; 22: transmission and reception device; 63: communication start time; 64: orbit information; 61: planned orbit information; 62: control signal; 200: communication satellite; 201: first communication satellite; 202: second communication satellite; 203: third communication satellite; 204: fourth communication satellite; 210: optical communication device; 211: biaxial rough-precision directivity control device; 212: biaxial high-precision directivity control device; 213: orbital attitude control device; 214: propulsion device; 215: power supply device; 800: flying object addressing system; 291: first data relay satellite; 292: second data relay satellite; 293: surveillance satellite; 294: handling device; 299: flying object; 500: optical communication system; 701: ground facility; 710: control unit; 720: storage unit; 910: processor; 921: memory; 922: auxiliary storage device; 930: input interface; 940: output interface; 941: display device; 950: communication device

The invention claimed is:

1. An optical communication system configured of three communication satellites each including an optical communication device and an orbital attitude control device, and a ground facility, each optical communication device including a plurality of optical communication terminals, wherein
    each of the plurality of optical communication terminals includes a biaxial rough-precision directivity control device and a biaxial high-precision directivity control device,
    the orbital attitude control device includes a memory to record planned orbit information of the three communication satellites, and exchanges a control signal with the biaxial rough-precision directivity control device,
    a first communication satellite flies as performing optical communication simultaneously with a second communication satellite and a third communication satellite,
    the ground facility transmits, to the first communication satellite and the second communication satellite, a command of a time when optical communication starts,
    the orbital attitude control device of the first communication satellite reads, from the memory, an orbit position of the second communication satellite at the communication start time, and transmits the control signal to the biaxial rough-precision directivity control device in one of the plurality of optical communication terminals of the optical communication device in the first communication satellite to cause the one of the plurality of optical communication terminals in the optical communication device of the first communication satellite to be directed to the second communication satellite,
    the orbital attitude control device of the second communication satellite reads, from the memory, an orbit position of the first communication satellite at the communication start time, and transmits the control signal to the biaxial rough-precision directivity control device in one of the plurality of optical communication terminals of the optical communication device in the second communication satellite to cause the one of the plurality of optical communication terminals in the optical communication device of the second communication satellite to be directed to the first communication satellite,
    from a state in which the first communication satellite and the second communication satellite are mutually directed to each other with rough precision, each establishes a high-precision directivity state by the biaxial high-precision directivity control device and, as mutually tracked by the biaxial rough-precision directivity control device in accordance with a relative position change based on the planned orbit information, each corrects a residual directivity error by the biaxial high-precision directivity control device,
    furthermore, the ground facility transmits, to the first communication satellite and the third communication satellite, a command of a time when optical communication starts,
    the orbital attitude control device of the first communication satellite reads, from the memory, an orbit position of the third communication satellite at the communication start time, and transmits the control signal to the biaxial rough-precision directivity control device in another one of the plurality of optical communication terminals of the optical communication device in the first communication satellite to cause the another one of the plurality of optical communication terminals in the optical communication device of the first communication satellite to be directed to the third communication satellite,
    the orbital attitude control device of the third communication satellite reads, from the memory, an orbit position of the first communication satellite at the communication start time, and transmits the control signal to the biaxial rough-precision directivity control device in one of the plurality of optical communication terminals of the optical communication device in the third communication satellite to cause the one of the plurality of optical communication terminals in the optical communication device of the third communication satellite to be directed to the first communication satellite, and
    from a state in which the first communication satellite and the third communication satellite are mutually directed to each other with rough precision, each establishes a high-precision directivity state by the biaxial high-precision directivity control device and, as mutually tracked by the biaxial rough-precision directivity control device in accordance with a relative position change based on the planned orbit information, each corrects a residual directivity error by the biaxial high-precision directivity control device.

2. An optical communication system configured of a first communication satellite including an optical communication device and an orbital attitude control device, N−1 communication satellites from a second communication satellite to an N-th communication satellite (N is a natural number equal to or more than 3) each including an optical communication device and an orbital attitude control device, and a ground facility, wherein each of the optical communication devices includes a plurality of optical communication terminals, and each of the optical communication terminals includes a biaxial rough-precision directivity control device and a biaxial high-precision directivity control device, the orbital attitude control device includes a memory to record planned orbit information of the first communication satellite and a flying object, and exchanges a control signal with the biaxial rough-precision directivity control device, the first communication satellite flies as performing optical communication simultaneously with the N−1 communication satellites, the first communication satellite includes a memory to record planned orbit information of the N−1 communication satellites, an n-th communication satellite (n is a natural number equal to or more than 2 and equal to or less than N) includes a memory to record planned orbit information of at least the first communication satellite and the n-th communication satellite, the optical communication system is configured to perform each of the following for each of the N−1 communication satellites:

the ground facility transmits, to the first communication satellite and the n-th communication satellite, a command of a time when optical communication starts, the orbital attitude control device of the first communication satellite reads, from the memory, an orbit position of the n-th communication satellite at the communication start time, and transmits the control signal to the biaxial rough-precision directivity control device in one of the plurality of optical communication terminals of the optical communication device in the first communication satellite to cause the one of the plurality of optical communication terminals in the optical communication device of the first communication satellite to be directed to the n-th communication satellite, the orbital attitude control device of the n-th communication satellite reads, from the memory, an orbit position of the first communication satellite at the communication start time, and transmits the control signal to the biaxial rough-precision directivity control device in one of the plurality of optical communication terminals of the optical communication device in the n-th communication satellite to cause the one of the plurality of optical communication terminals in the optical communication device of the n-th communication satellite to be directed to the first communication satellite, and from a state in which the first communication satellite and the n-th communication satellite are mutually directed to each other with rough precision, each establishes a high-precision directivity state by the biaxial high-precision directivity control device and, as mutually tracked by the biaxial rough-precision directivity control device in accordance with a relative position change based on the planned orbit information, each corrects a residual directivity error by the biaxial high-precision directivity control device.

3. The optical communication system according to claim 2, wherein the ground facility transmits orbit information of mutual communication satellites which perform optical communication with each other to the mutual communication satellites, and the orbital attitude control device of the mutual communication satellites makes an angular conversion of a change in a relative position relation with a communication satellite as a communication target to control the biaxial rough-precision directivity control device.

4. The optical communication system according to claim 2, wherein the ground facility transmits relative position information of mutual communication satellites which perform optical communication with each other to the mutual communication satellites, and the orbital attitude control device of the mutual communication satellites makes an angular conversion of a change in a relative position relation with a communication satellite as a communication target to control the biaxial rough-precision directivity control device.

5. The optical communication system according to claim 2, wherein mutual communication satellites which perform optical communication with each other exchange mutual orbit information via optical communication, and the orbital attitude control device of the mutual communication satellites makes an angular conversion of a change in a relative position relation with a communication satellite as a communication target to control the biaxial rough-precision directivity control device.

6. The optical communication system according to claim 2, wherein the communication satellites each include an electric propulsion device, mutual communication satellites which perform optical communication with each other exchange, via optical communication, control parameter information of the orbital attitude control device operating the electric propulsion device, and the orbital attitude control device of the communication satellites makes an angular conversion of a change in a relative position relation with a communication satellite as a communication target to control the biaxial rough-precision directivity control device.

7. The optical communication system according to claim 2, wherein the communication satellites each include an electric propulsion device, mutual communication satellites which perform optical communication with each other exchange, via optical communication, control parameter information of the orbital attitude control device operating the electric propulsion device, and transmit the control parameter information to the ground facility, the ground facility collectively manages operating conditions of the propulsion devices of all of the communication satellites to perform management of satellite constellation operation, orbit information of all of the communication satellites is transmitted to a communication satellite flying in a communication visual field range of the communication satellite, the orbit information is transmitted to all of the communication satellites via an optical communication circuit among the communication satellites, and the orbital attitude control device of the communication satellites makes an angular conversion of a change in a relative position relation with a communication satellite as a communication target to control the biaxial rough-precision directivity control device.

8. The optical communication system according to claim 2, wherein

N is equal to eight or more, and the N communication satellites each including a communication device which performs inter-satellite communication and a communication device which communicates with the ground facility and are configured to fly on a same orbital plane in substantially uniform arrangement, and form a satellite constellation in which eight or more said orbital planes are substantially uniformly arranged in a longitudinal direction, wherein the communication device in each of the N communication satellites is configured to communicate with a user satellite to relay and transmit satellite information between the user satellite and the ground facility, the optical communication system, is configured to perform the following when the communication satellite passes northward above the equator with a satellite forwarding direction taken as a +X direction and a geocentric direction taken as a +Z direction:

a first optical communication terminal to perform optical communication with a front satellite in a flying direction on a same orbital plane, a second optical communication terminal to perform optical communication with a rear satellite in the flying direction on the same orbital plane, a third optical communication terminal to perform optical communication with a satellite flying northeast (+X+Y) of an east-side (+Y) adjacent orbit, and a fourth optical communication terminal to perform optical communication with a satellite flying southwest (−X−Y) of a west-side (−Y) adjacent orbit, an Azimuth communication visual field of the third optical communication terminal is equal to or more than ±90° with respect to the forwarding direction (+X axis), and an Azimuth communication visual field of the fourth optical communication terminal is equal to or more than ±90° with respect to a direction (−X axis) opposite to the forwarding direction.

9. The optical communication system according to claim 8, wherein an earth-oriented direction of the communication satellite is taken as a Z axis and the forwarding direction is taken as an X axis, each of the optical communication terminals is an optical communication terminal in which a directivity direction can be changed to two axes, Azimuth rotation about the Z axis and Elevation rotation perpendicular to the Z axis, the first optical communication terminal and the second optical communication terminal are arranged on an earth-oriented plane (+Z plane), the third optical communication terminal and the fourth optical communication terminal are arranged on a counter-earth-oriented plane (−Z plane), a driving center of the first optical communication terminal and a driving center of the third optical communication terminal are not on a same axis of a forwarding direction vector, and a driving center of the second optical communication terminal and a driving center of the fourth optical communication terminal are not on a same axis of the forwarding direction vector.

10. A flying object addressing system configured of:

a first data relay satellite flying with an orbital altitude equal to or more than 2000 km above the equator;

a second data relay satellite flying with an orbital altitude equal to or more than 2000 km in a polar orbit;

a plurality of surveillance satellites flying with an orbital altitude equal to or less than 2000 km; and a handling device moving in airspace in earth's atmosphere, on ground, or by sea and a handling device fixed to ground, wherein the plurality of surveillance satellites acquire surveillance data of a flying object launched from ground to fly and transmits the surveillance data to the handling devices via the data relay satellites, the handling devices perform handling action on the flying object, and the flying object addressing system further including an optical communication system according to claim 2, wherein the first data relay satellite, the second data relay satellite, and the plurality of surveillance satellites are included in the N−1 communication satellites.

11. An optical communication system configured of a first communication satellite including an optical communication device and an orbital attitude control device, N movable bodies (N is a natural number) each including an optical communication device and an orbital attitude control device, and a ground facility, wherein each of the optical communication devices includes a plurality of optical communication terminals, and each of the optical communication terminals includes a biaxial rough-precision directivity control device and a biaxial high-precision directivity control device, the orbital attitude control device includes a memory to record planned orbit information or position information of the first communication satellite and the movable body, and exchanges a control signal with the biaxial rough-precision directivity control device, the first communication satellite flies as performing optical communication simultaneously with the N movable bodies, the first communication satellite includes a memory to record the planned orbit information or the position information of the N movable bodies, an n-th movable body (n is a natural number equal to or less than N) includes a memory to record planned orbit information or position information of at least the first communication satellite and the n-th movable body, the optical communication system is configured to perform each of the following for each of the N movable bodies:

the ground facility transmits, to the first communication satellite and the n-th movable body, a command of a time when optical communication starts, the orbital attitude control device of the first communication satellite reads, from the memory, position information of the n-th movable body at the communication start time, and transmits the control signal to the biaxial rough-precision directivity control device in one of the plurality of optical communication terminals of the optical communication device in the first communication satellite to cause the one of the plurality of optical communication terminals in the optical communication device of the first communication satellite to be directed to the n-th movable body, the orbital attitude control device of the n-th movable body reads, from the memory, an orbit position of the first communication satellite at the communication start time, and transmits the control signal to the biaxial rough-precision directivity control device in one of the plurality of optical communication terminals of the optical communication device in the n-th movable body to cause the optical communication device in the n-th movable body to be directed to the first communication satellite, and from a state in which the first communication satellite and the n-th movable body are mutually directed to each other with rough precision, each establishes a high-precision directivity state by the biaxial high-precision directivity control device and, as mutually tracked by the biaxial rough-precision directivity control device in accordance with a relative position change based on the planned orbit information, each corrects a residual directivity error by the biaxial high-precision directivity control device.

12. The optical communication system according to claim 11, wherein
the ground facility transmits orbit information of mutual communication satellites which perform optical communication with each other to the mutual communication satellites, and
the orbital attitude control device of the mutual communication satellites makes an angular conversion of a change in a relative position relation with a communication satellite as a communication target to control the biaxial rough-precision directivity control device.

13. The optical communication system according to claim 11, wherein
the ground facility transmits relative position information of mutual communication satellites which perform optical communication with each other to the mutual communication satellites, and
the orbital attitude control device of the mutual communication satellites makes an angular conversion of a change in a relative position relation with a communication satellite as a communication target to control the biaxial rough-precision directivity control device.

14. The optical communication system according to claim 11, wherein
mutual communication satellites which perform optical communication with each other exchange mutual orbit information via optical communication, and
the orbital attitude control device of the mutual communication satellites makes an angular conversion of a change in a relative position relation with a communication satellite as a communication target to control the biaxial rough-precision directivity control device.

15. An optical communication system configured of a first communication satellite including an optical communication device and an orbital attitude control device, N−1 communication satellites from a second communication satellite to an N-th communication satellite (N is a natural number equal to or more than 3) each including an optical communication device and an orbital attitude control device, and a ground facility including an optical communication device, wherein each of the optical communication devices includes a plurality of optical communication terminals, and each of the optical communication terminals includes a biaxial rough-precision directivity control device and a biaxial high-precision directivity control device, the orbital attitude control device includes a memory to record planned orbit information of the first communication satellite and the N−1 communication satellites and position coordinates of the ground facility, and exchanges a control signal with the biaxial rough-precision directivity control device, the first communication satellite flies as performing optical communication simultaneously with the N−1 communication satellites, the ground facility transmits, to the first communication satellite, a command of the position coordinates of the ground facility and a time when optical communication starts, the orbital attitude control device of the first communication satellite reads, from the memory, position coordinates of the ground facility at the communication start time, and transmits the control signal to the biaxial rough-precision directivity control device in one of the plurality of optical communication terminals of the optical communication device in the first communication satellite to cause the one of the plurality of optical communication terminals in the optical communication device of the first communication satellite to be directed to the ground facility, the ground facility transmits the control signal to the biaxial rough-precision directivity control device in one of the plurality of optical communication terminals of the optical communication device in the ground facility to cause the one of the plurality of optical communication terminals in the optical communication device of the ground facility to be directed to the first communication satellite, from a state in which the first communication satellite and the ground facility are mutually directed to each other with rough precision, each establishes a high-precision directivity state by the biaxial high-precision directivity control device and, as mutually tracked by the biaxial rough-precision directivity control device in accordance with a relative position change based on the planned orbit information, each corrects a residual directivity error by the biaxial high-precision directivity control device, furthermore, the first communication satellite includes a memory to record planned orbit information of the N−1 communication satellites, an n-th communication satellite (n is a natural number equal to or more than 2 and equal to or less than N) includes a memory to record planned orbit information of at least the first communication satellite and the n-th communication satellite, the optical communication system is configured to perform each of the following for each of the N−1 communication satellites:
the ground facility transmits, to the first communication satellite and the n-th communication satellite, a command of a time when optical communication starts,
the orbital attitude control device of the first communication satellite reads, from the memory, an orbit position of the n-th communication satellite at the communication start time, and transmits the control signal to the biaxial rough-precision directivity control device in one of the plurality of optical communication terminals of the optical communication device in the first communication satellite to cause the one of the plurality of optical communication terminals in the optical communication device of the first communication satellite to be directed to the n-th communication satellite, the orbital attitude control device of the n-th communication satellite reads, from the memory, an orbit position of the first communication satellite at the communication start time, and transmits the control signal to the biaxial rough-precision directivity control device in one of the plurality of optical communication terminals of the optical communication device in the n-th communication satellite to cause the one of the plurality of optical communication terminals in the optical communication device of the n-th communication satellite to be directed to the first communication satellite, and from a state in which the first communication satellite and the n-th communication satellite are mutually directed to each other with rough precision, each establishes a high-precision directivity state by the biaxial high-precision directivity control device and, as mutually tracked by the biaxial rough-precision directivity control device in accordance with a relative position change based on the planned orbit information, each corrects a residual directivity error by the biaxial high-precision directivity control device.

16. The optical communication system according to claim 15, wherein
the ground facility transmits orbit information of mutual communication satellites which perform optical communication with each other to the mutual communication satellites, and
the orbital attitude control device of the mutual communication satellites makes an angular conversion of a change in a relative position relation with a communication satellite as a communication target to control the biaxial rough-precision directivity control device.

17. The optical communication system according to claim 15, wherein
the ground facility transmits relative position information of mutual communication satellites which perform optical communication with each other to the mutual communication satellites, and
the orbital attitude control device of the mutual communication satellites makes an angular conversion of a change in a relative position relation with a communication satellite as a communication target to control the biaxial rough-precision directivity control device.

18. The optical communication system according to claim 15, wherein
mutual communication satellites which perform optical communication with each other exchange mutual orbit information via optical communication, and
the orbital attitude control device of the mutual communication satellites makes an angular conversion of a change in a relative position relation with a communication satellite as a communication target to control the biaxial rough-precision directivity control device.

19. An optical communication system configured of a first communication satellite including an optical communication device and an orbital attitude control device, N−1 communication satellites from a second communication satellite to an N-th communication satellite (N is a natural number equal to or more than 3) each including an optical communication device and an orbital attitude control device, M flying objects (M is a natural number) each including an optical communication device and an orbital attitude control device, and a ground facility including an optical communication device, wherein each of the optical communication devices includes a plurality of optical communication terminals, and each of the optical communication terminals includes a biaxial rough-precision directivity control device and a biaxial high-precision directivity control device, the orbital attitude control device includes a memory to record planned orbit information of the communication satellites and the flying objects and position coordinates of the ground facility, and exchanges a control signal with the biaxial rough-precision directivity control device, the first communication satellite flies as performing optical communication simultaneously with the N−1 communication satellites, the ground facility transmits, to the first communication satellite, a command of the position coordinates of the ground facility and a time when optical communication starts, the orbital attitude control device of the first communication satellite reads, from the memory, position coordinates of the ground facility at the communication start time, and transmits the control signal to the biaxial rough-precision directivity control device in one of the plurality of optical communication terminals of the optical communication device in the first communication satellite to cause the one of the plurality of optical communication terminals in the optical communication device of the first communication satellite to be directed to the ground facility, the ground facility transmits the control signal to the biaxial rough-precision directivity control device in one of the plurality of optical communication terminals of the optical communication device in the ground facility to cause the one of the plurality of optical communication terminals in the optical communication device of the ground facility to be directed to the first communication satellite, from a state in which the first communication satellite and the ground facility are mutually directed to each other with rough precision, each establishes a high-precision directivity state by the biaxial high-precision directivity control device and, as mutually tracked by the biaxial rough-precision directivity control device in accordance with a relative position change based on the planned orbit information, each corrects a residual directivity error by the biaxial high-precision directivity control device, furthermore, the first communication satellite includes a memory to record planned orbit information of the N−1 communication satellites, an n-th communication satellite (n is a natural number equal to or more than 2 and equal to or less than N) includes a memory to record planned orbit information of at least the first communication satellite and the n-th communication satellite, the optical communication system is configured to perform each of the following for each of the N−1 communication satellites:

the ground facility transmits, to the first communication satellite and the n-th communication satellite, a command of a time when optical communication starts, the orbital attitude control device of the first communication satellite reads, from the memory, an orbit position of the n-th communication satellite at the communication start time, and transmits the control signal to the biaxial rough-precision directivity control device in one of the plurality of optical communication terminals of the optical communication device in the first communication satellite to cause the one of the plurality of optical communication terminals in the optical communication device of the first communication satellite to be directed to the n-th communication satellite, the orbital attitude control device of the n-th communication satellite reads, from the memory, an orbit position of the first communication satellite at the communication start time, and transmits the control signal to the biaxial rough-precision directivity control device in one of the plurality of optical communication terminals of the optical communication device in the n-th communication satellite to cause the one of the plurality of optical communication terminals in the optical communication device in the n-th communication satellite to be directed to the first communication satellite, and from a state in which the first communication satellite and the n-th communication satellite are mutually directed to each other with rough precision, each establishes a high-precision directivity state by the biaxial high-precision directivity control device and, as mutually tracked by the biaxial rough-precision directivity control device in accordance with a relative position change based on the planned orbit information, each corrects a residual directivity error by the biaxial high-precision directivity control device, furthermore, the first communication satellite includes a memory to record planned orbit information of the M flying objects, an m-th flying object (m is a natural number equal to or less than M) includes a memory to record planned orbit information of at least the first communication satellite and the m-th flying object, the optical communication system is configured to perform each of the following for each of the M flying objects:

the ground facility transmits, to the first communication satellite and the m-th flying object, a command of a time when optical communication starts, the orbital attitude control device of the first communication satellite reads, from the memory, an orbit position of the m-th flying object at the communication start time, and transmits the control signal to the biaxial rough-precision directivity control device in one of the plurality of optical communication terminals of the optical communication device in the first communication satellite to cause the one of the plurality of optical communication terminals in the optical communication device of the first communication satellite to be directed to the m-th flying object, the orbital attitude control device of the m-th flying object reads, from the memory, an orbit position of the first communication satellite at the communication start time, and transmits the control signal to the biaxial rough-precision directivity control device in one of the plurality of optical communication terminals of the communication device in the m-th flying object to cause the optical communication device of the m-th flying object to be directed to the first communication satellite, from a state in which the first communication satellite and the m-th flying object are mutually directed to each other with rough precision, each establishes a high-precision directivity state by the biaxial high-precision directivity control device and, as mutually tracked by the biaxial rough-precision directivity control device in accordance with a relative position change based on the planned orbit information, each corrects a residual directivity error by the biaxial high-precision directivity control device.

20. The optical communication system according to claim 19, wherein the ground facility transmits orbit information of mutual communication satellites which perform optical communication with each other to the mutual communication satellites, and the orbital attitude control device of the mutual communication satellites makes an angular conversion of a change in a relative position relation with a communication satellite as a communication target to control the biaxial rough-precision directivity control device.

21. The optical communication system according to claim 19, wherein the ground facility transmits relative position information of mutual communication satellites which perform optical communication with each other to the mutual communication satellites, and the orbital attitude control device of the mutual communication satellites makes an angular conversion of a change in a relative position relation with a communication satellite as a communication target to control the biaxial rough-precision directivity control device.

22. The optical communication system according to claim 19, wherein mutual communication satellites which perform optical communication with each other exchange mutual orbit information via optical communication, and the orbital attitude control device of the mutual communication satellites makes an angular conversion of a change in a relative position relation with a communication satellite as a communication target to control the biaxial rough-precision directivity control device.

* * * * *